(12) United States Patent
Deering

(10) Patent No.: US 7,106,352 B2
(45) Date of Patent: Sep. 12, 2006

(54) AUTOMATIC GAIN CONTROL, BRIGHTNESS COMPRESSION, AND SUPER-INTENSITY SAMPLES

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 184 days.

(21) Appl. No.: 10/378,049

(22) Filed: Mar. 3, 2003

(65) Prior Publication Data
US 2004/0174378 A1 Sep. 9, 2004

(51) Int. Cl.
G09G 5/02 (2006.01)
G09G 5/39 (2006.01)
G06T 15/00 (2006.01)
G09G 5/00 (2006.01)
G06T 11/00 (2006.01)

(52) U.S. Cl. ............... 345/694; 345/428; 345/581; 345/606; 345/555; 382/254; 382/260; 382/300

(58) Field of Classification Search ........ 345/581–582, 345/589, 606, 611, 597, 594, 647, 519–520, 345/530–532, 559, 552, 545, 542, 418–428, 345/539, 555–556; 710/306, 305; 711/100, 711/105, 154; 382/260–276, 300, 254–255, 382/232–234
See application file for complete search history.

(56) References Cited

U.S. PATENT DOCUMENTS 6,128,000 A * 10/2000 Jouppi et al. ............ 345/614
6,208,766 B1 3/2001 Schweyer et al.
6,313,838 B1 * 11/2001 Deering ................. 345/420
6,456,292 B1 * 9/2002 Chan et al. .............. 345/589

(Continued)

FOREIGN PATENT DOCUMENTS

EP 0732669 9/1996

(Continued)

OTHER PUBLICATIONS

International Search Report dated Feb. 4, 2005, PCT/US2004/006259.

Primary Examiner—Kee M. Tung
Assistant Examiner—Wesner Sajous
(74) Attorney, Agent, or Firm—Meyertons Hood Kivlin Kowert & Goetzel, P.C.; Jeffrey C. Hood; Mark K. Brightwell

(57) ABSTRACT

A filtering engine may read samples from a sample buffer and spatially filter (e.g., convolve) the samples to generate pixels. The pixels may have a high dynamic range of luminance. Thus, the filtering engine may apply automatic gain control and/or dynamic range compression on pixel luminance or pixel color. A rendering engine may generate the samples in response to received graphics data and store the samples in the sample buffer. A sample may include one or more data fields which represent color (or intensity) information. The data field may include exponent information (e.g., an amplification control bit) and a mantissa. The exponent information may determine an extent to which the mantissa is amplified (e.g., left shifted) in the filtering engine.

58 Claims, 19 Drawing Sheets

U.S. PATENT DOCUMENTS

| | | | |
|---|---|---|---|
| 6,618,054 B1 * | 9/2003 | Deering | 345/581 |
| 6,731,292 B1 * | 5/2004 | Burk et al. | 345/519 |
| 6,771,272 B1 * | 8/2004 | Deering | 345/581 |
| 6,834,125 B1 * | 12/2004 | Woodell et al. | 382/274 |
| 2002/0122044 A1 * | 9/2002 | Deering | 345/597 |
| 2002/0159648 A1 * | 10/2002 | Alderson et al. | 382/260 |
| 2003/0142104 A1 * | 7/2003 | Lavelle et al. | 345/552 |
| 2003/0184551 A1 * | 10/2003 | Kurihara et al. | 345/572 |
| 2004/0012611 A1 * | 1/2004 | Taneja et al. | 345/611 |
| 2004/0042676 A1 * | 3/2004 | Srinivasa | 382/254 |

FOREIGN PATENT DOCUMENTS

| | | |
|---|---|---|
| WO | WO97/33271 | 9/1997 |
| WO | WO 99/41706 | 8/1999 |
| WO | WO01/52192 | 7/2001 |

\* cited by examiner

AUTOMATIC GAIN CONTROL, BRIGHTNESS COMPRESSION, AND SUPER-INTENSITY SAMPLES

BACKGROUND OF THE INVENTION

1. Field of the Invention

This invention relates generally to the field of computer graphics and, more particularly, to the field of hardware graphics accelerators.

2. Description of the Related Art

Graphics rendering systems may be configured to compute frames of pixels in response to frames of received graphics data. The computed pixels may have a larger dynamic range of luminance than the display devices that will display the output video. Thus, there exists a need for systems and methods capable of compressing the dynamic range of images generated by graphics rendering systems to conform to the dynamic range of display devices such as monitors, projectors, head mounted displays, printers, etc.

Some of the frames generated by the graphics rendering system may have an over-exposed appearance on screen because the magnitude of the computed pixels representing those frames are significantly larger on average than a maximum displayable pixel intensity. Other frames may have an under-exposed appearance because the magnitude of the computed pixels representing those frames are much smaller than the maximum displayable pixel intensity. Furthermore, it is possible that a single rendered frame may have both underexposed portions and overexposed portions. Thus, there exists a need for a system and method that is capable of scaling the intensity of frames of pixels to achieve an optimal amount of average luminance per frame relative to the displayable range of luminosities for a display device.

A software rendering system may be configured to (a) generate supersamples in response to received graphics data and (b) compute pixels by filtering the supersamples. The filtering process may involve the averaging of hundreds of supersamples to determine a single pixel. If the numeric range of the supersamples is limited, a single sample may not have sufficient energy to turn on a pixel by itself. Thus, when rendering a dot, it may be necessary to represent the dot (or line) with a set (e.g., a disk shaped region) of supersamples centered on the dot position. Furthermore, the transparency values of the set of supersamples may be ramped down to zero as some function of radius with respect to the dot position to avoid jaggedness in the dot's onscreen appearance. The filtering performed in (b) further smoothes and widens the dot. A one-dimensional object such as a line segment may also require representation as a set (e.g. a rectangle) of supersamples and transparency modulation to avoid the anti-aliasing artifacts. Thus, zero-dimensional or one-dimensional objects may end up non-trivially occluding portions of more distant objects. Therefore, there exists a need for a system and method capable of rendering dots and lines in a manner that avoids aliasing artifacts, and yet, reduces (or minimizes) the occlusion of more distant objects (or portions of objects).

SUMMARY

In various embodiments, a graphics system may be configured with a rendering engine, a sample buffer and a filtering engine. The rendering engine may receive graphics primitives (e.g., from the system memory of a host computer), render the graphics primitives into samples, and store the samples in the sample buffer. The filtering engine may selectively read the samples from a sample buffer and spatially filter (e.g., convolve) the samples to generate pixels. The pixels may have a high dynamic range of luminance. Thus, the filtering engine may apply automatic gain control and/or dynamic range compression on the luminance or color components of pixels.

In one set of embodiments, the filtering engine may apply automatic gain control by estimating an image luminance for a current frame, computing a pixel gain based on a comparison of the image luminance and a target luminance, and then, applying the pixel gain to pixels in the next frame (e.g., by scaling the color values of pixels in the next frame by the pixel gain).

In another set of embodiments, the filtering engine may apply dynamic range compression by computing compression parameters at each point in a set of points spanning (or sampling) a current frame, storing the compression parameters in a parameter storage unit, and applying a dynamic range compression operation to pixels in the next frame using the stored parameters. The stored parameters (which correspond to grid points) may be interpolated to generate an appropriate set of parameters for each pixel in the next frame.

In yet another set of embodiments, the rendering engine may receive a graphics primitive and determine if the graphics primitive has a dimension less than or equal to one. If so, the rendering engine may designate any samples generated for the primitive as super-intensity samples by setting one or more amplification control bits associated with the samples to an active state. The filtering engine reads the samples and performs a conditional amplification operation on sample color components depending on the state of the amplification control bits. Thus, the super-intensity samples contribute more significantly to the color value summations that are generated in the course of computing a pixel.

In yet another set of embodiments, the rendering engine may be configured to receive a graphics primitive and determine if the graphics primitive is a one-dimensional object (e.g., a line segment). If so, the rendering engine may (a) generate a series of sample positions along the one-dimensional object, (b) compute samples at the sample positions in the series, (c) modify exponent information in the computed samples, thereby distinguishing the samples as super-intensity samples, and (d) storing the super-intensity samples in a sample buffer. The filtering engine may be configured to (e) receive samples including the super-intensity samples from the sample buffer, (f) conditionally amplify a mantissa of each of the received samples based on a state of corresponding exponent information, and (g) filter the received samples after the conditional amplification to generate pixels. The pixels are usable to define at least a portion of a displayable image.

In yet another set of embodiments, the rendering engine may be configured to receive a graphics primitive and determine if the graphics primitive is a dot. If it is a dot, the rendering engine may be configured to: (a) generate a sample position at a location of the dot, (b) compute a sample at the dot position, (c) modify exponent information in one or more components of the sample, thereby distinguishing the sample as a super-intensity sample, and (d) storing the super-intensity sample in a sample buffer. The filtering engine may be configured to (e) read samples including the super-intensity sample from the sample buffer, (f) conditionally amplify a mantissa of each of the samples based on a state of corresponding exponent information, and (g) filter the samples after the conditional amplification to generate pixels. Again, the pixels are usable to define at least a portion of a displayable image.

BRIEF DESCRIPTION OF THE DRAWINGS

A better understanding of the present invention can be obtained when the following detailed description is considered in conjunction with the following drawings, in which.

Figure 1:
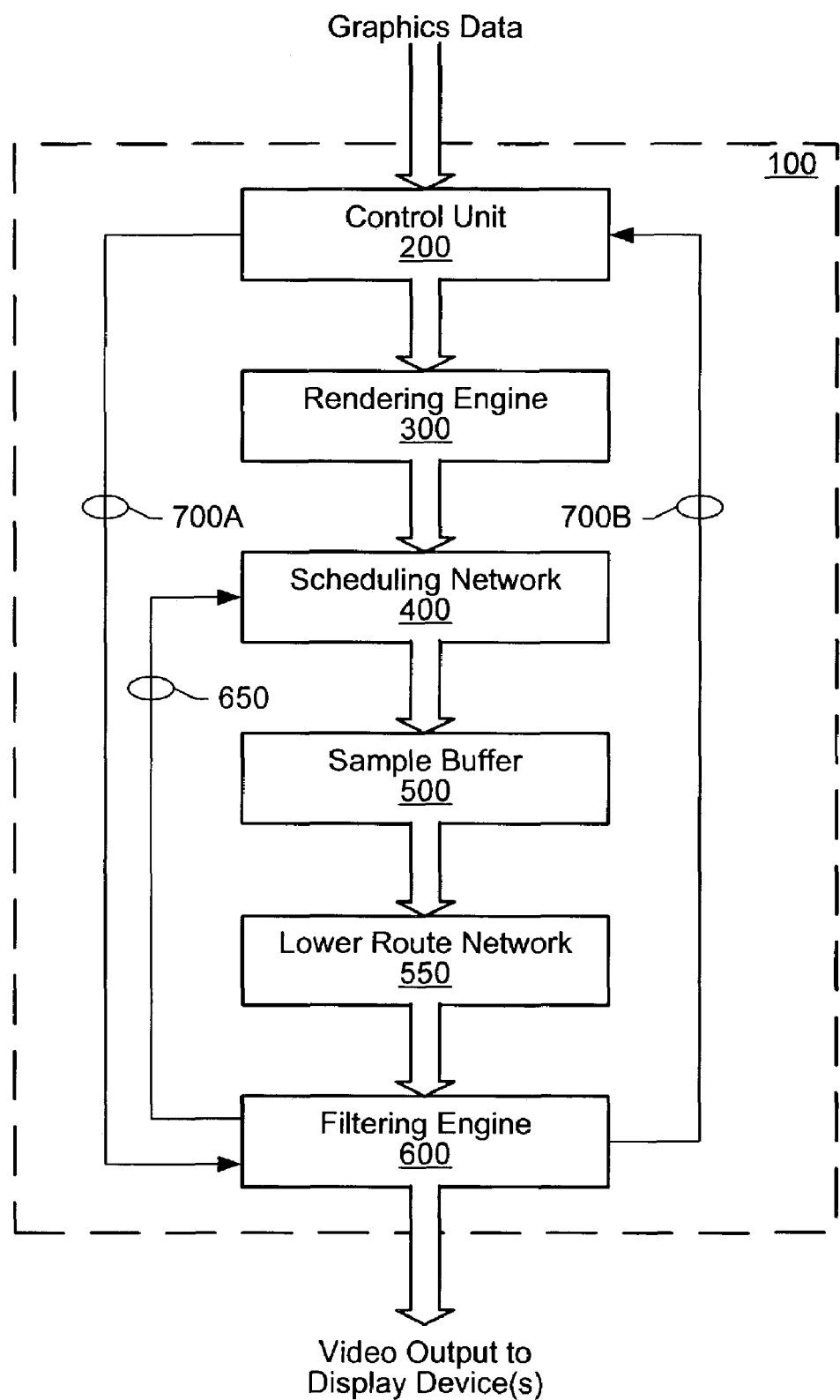
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
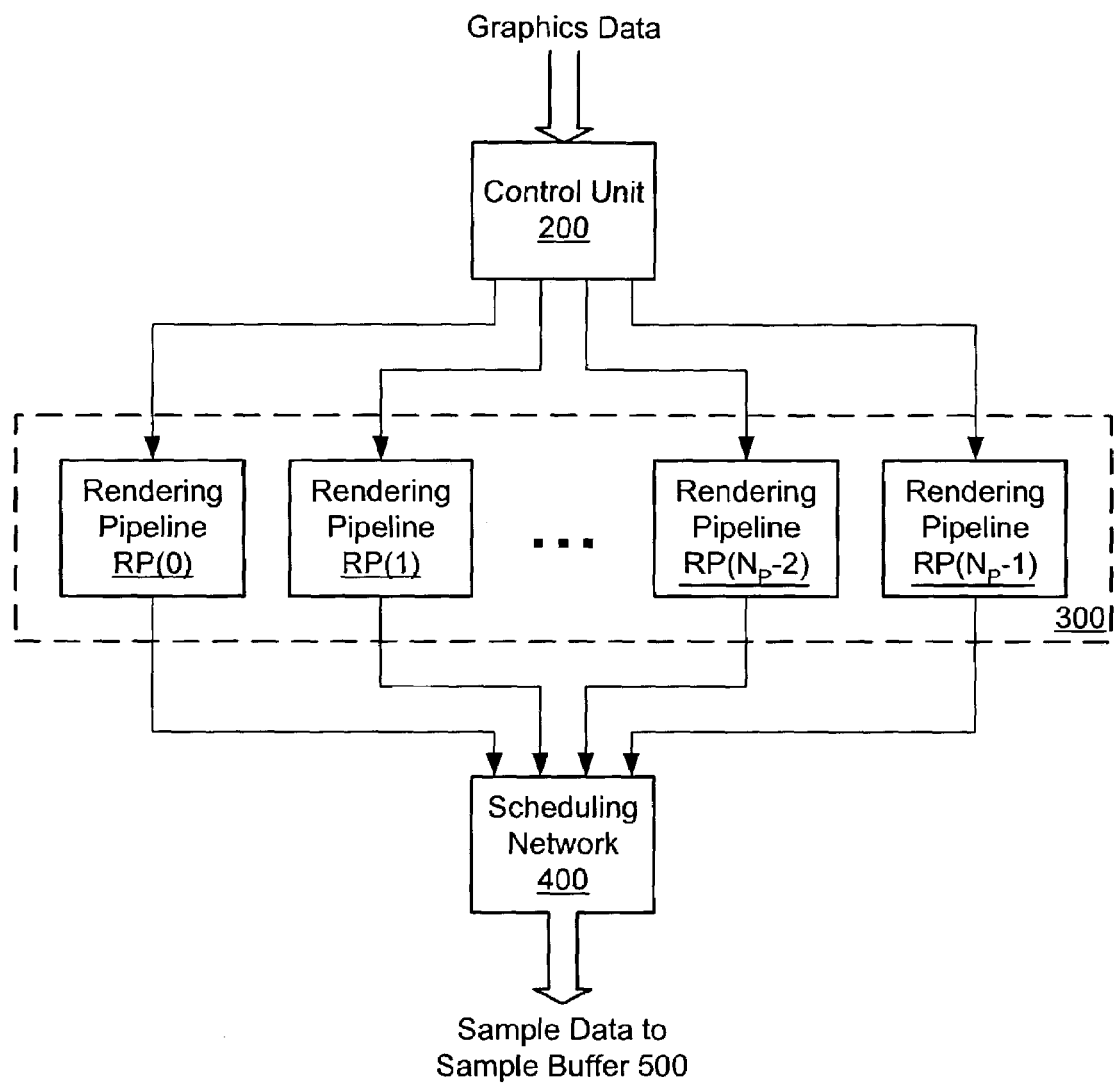
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}-1$), are configured to operate in parallel. For example, in one embodiment, $N_{PL}$ equals four. In another embodiment, $N_{PL}=8$.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to ND independent video pixel streams denoted VPS(0), VPS(1), ..., VPS($N_D$-1), where $N_D$ is a positive integer. Thus, a set of host applications (running on a host computer) may send $N_D$ graphics data streams denoted GDS(0), GDS(1), ..., GDS($N_D$-1) to the graphics system 100. The rendering engine 300 may perform rendering computations on each graphics data stream GDS(I), for I=0, 1, 2, ..., $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
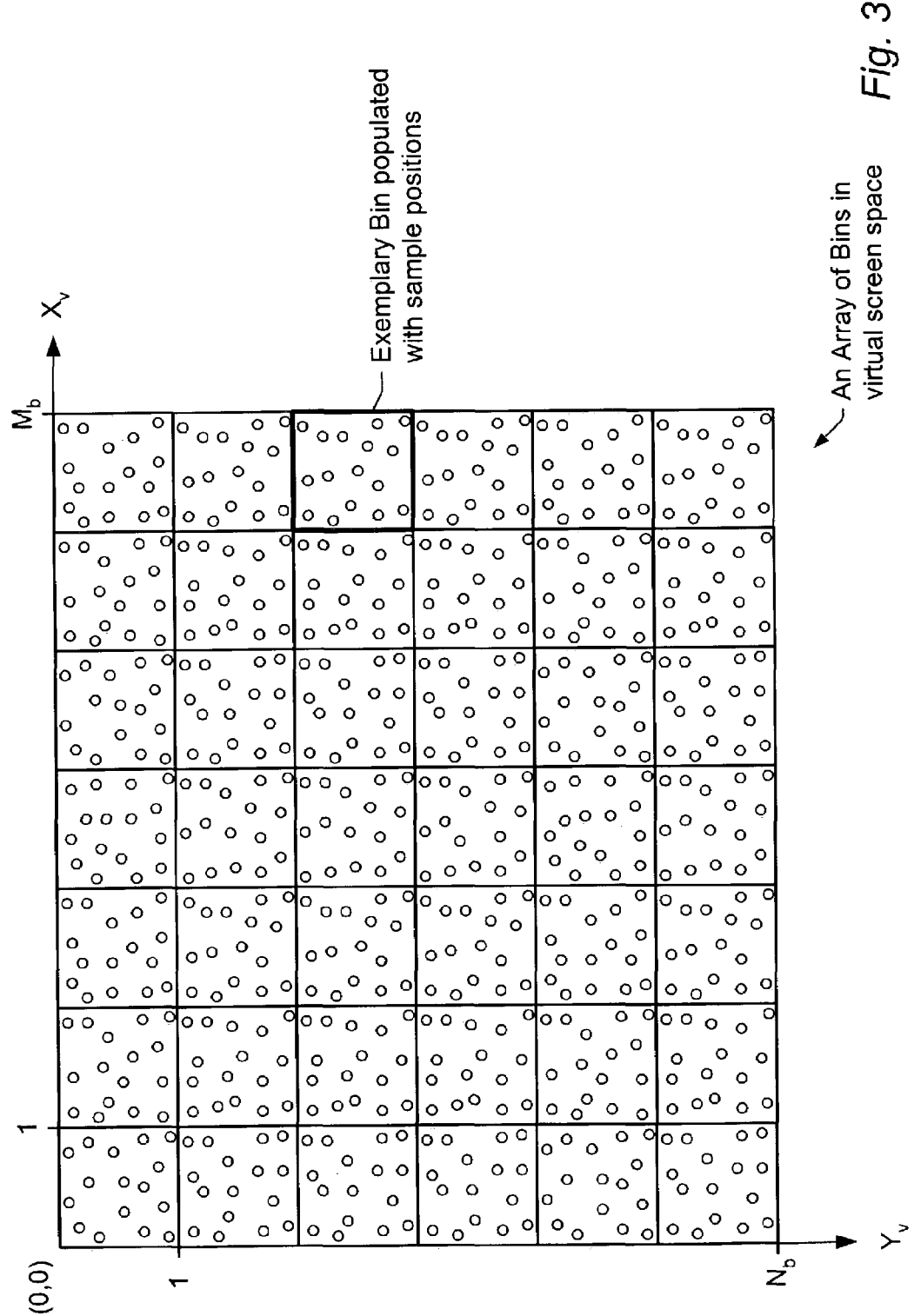
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
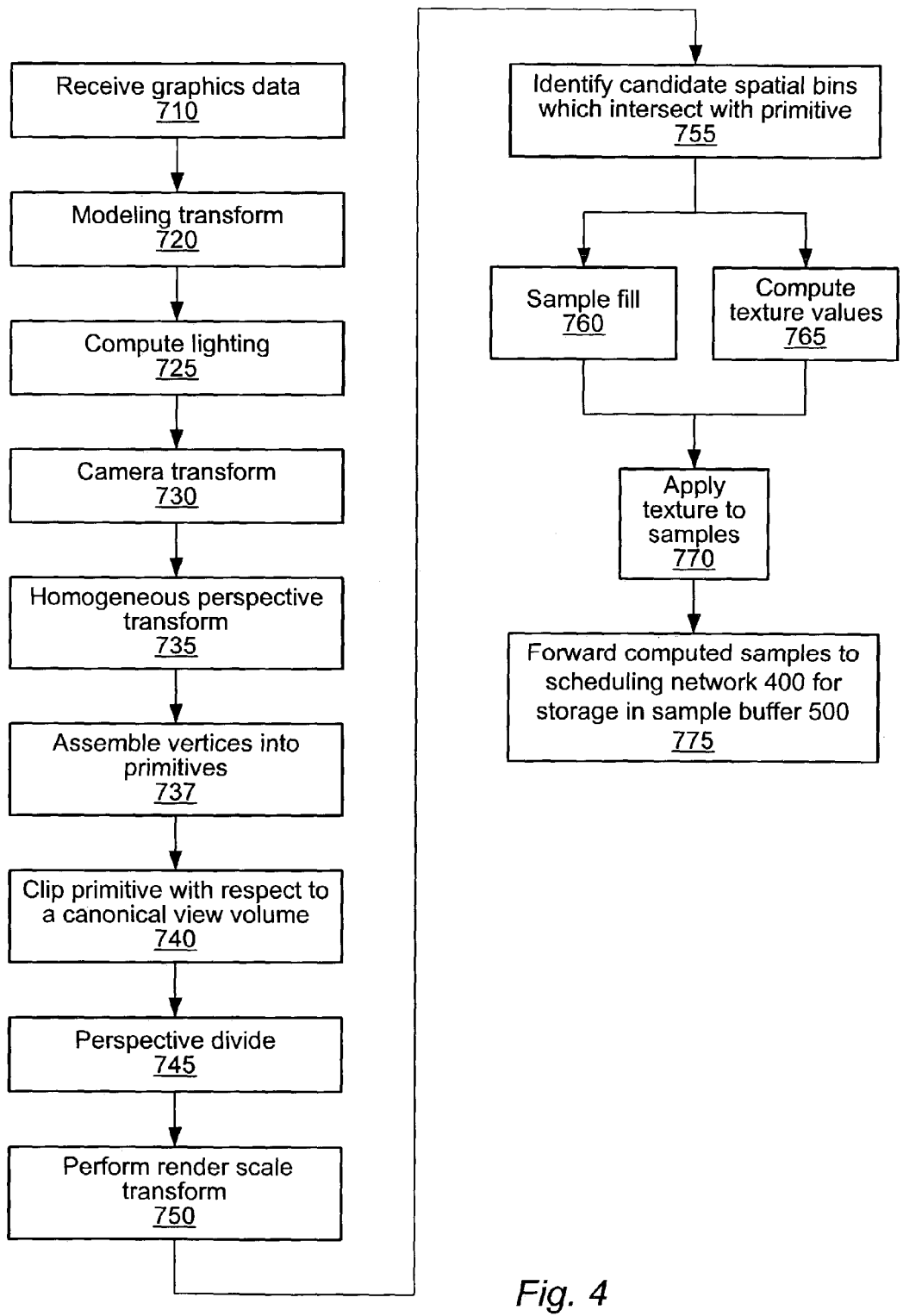
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1 = (-W \leq X)$ $T2 = (X \leq W)$ $T3 = (-W \leq Y)$ $T4 = (Y \leq W)$ $T5 = (-W \leq Z)$ $T6 = (Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $x = X/W$ $y = Y/W$ $z = Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_\nu$ and $Y_\nu$ denote the horizontal and vertical coordinate respectively in the virtual screen space.

Figure 5:
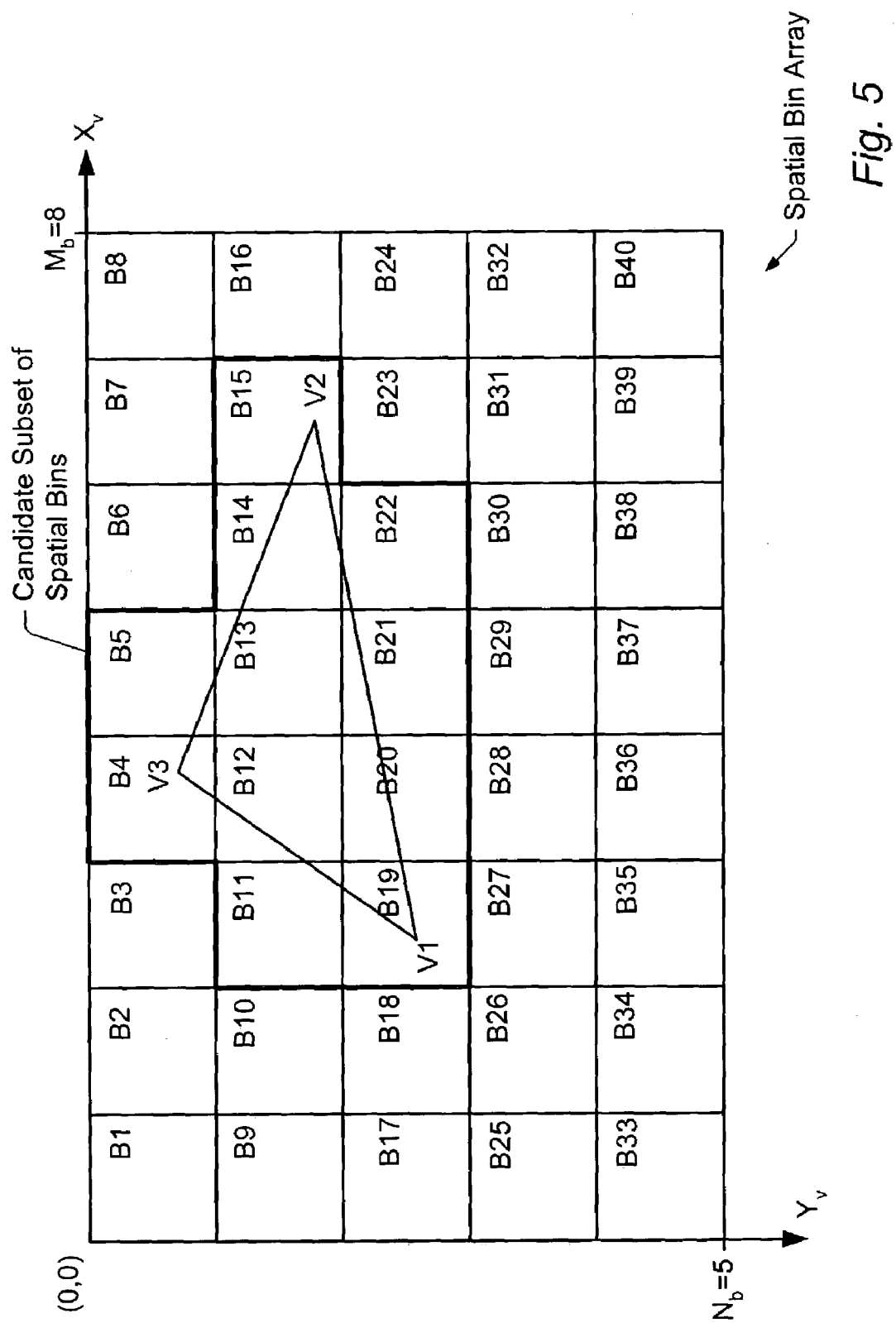
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
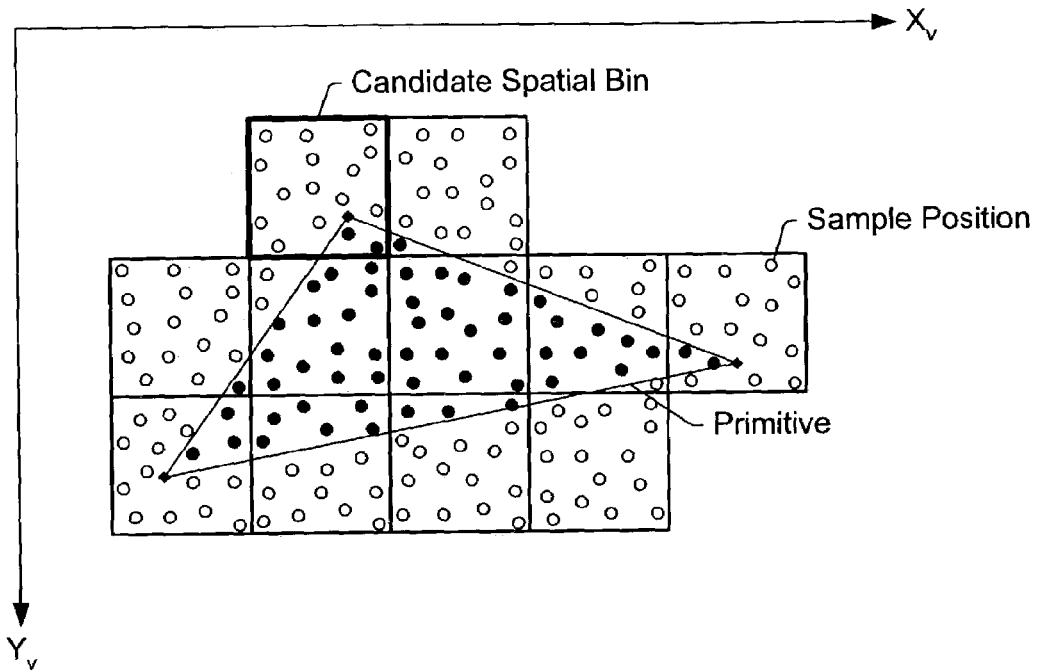
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
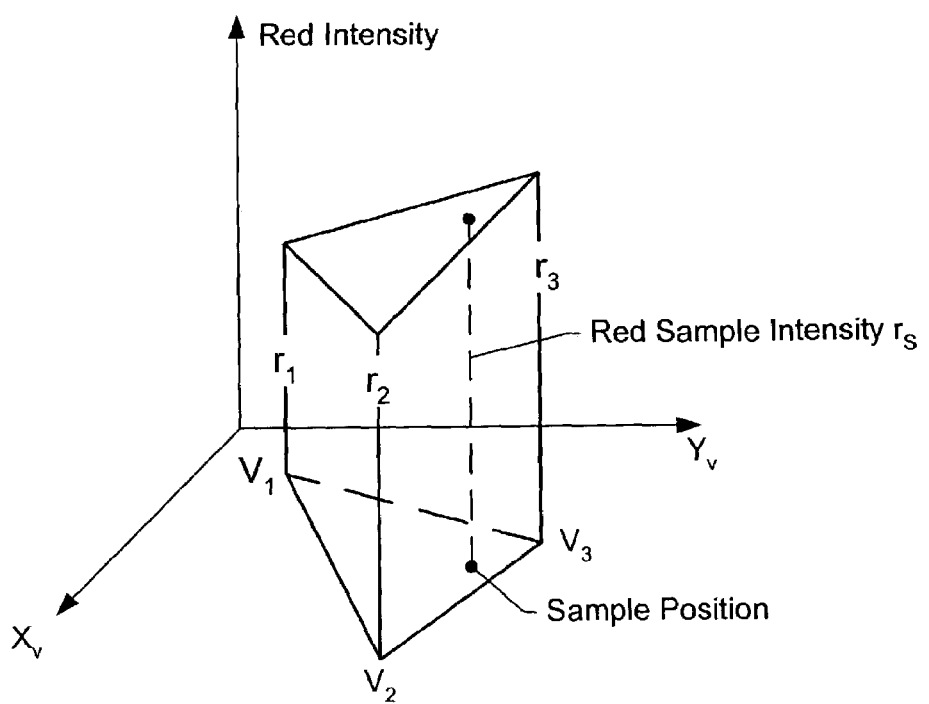
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
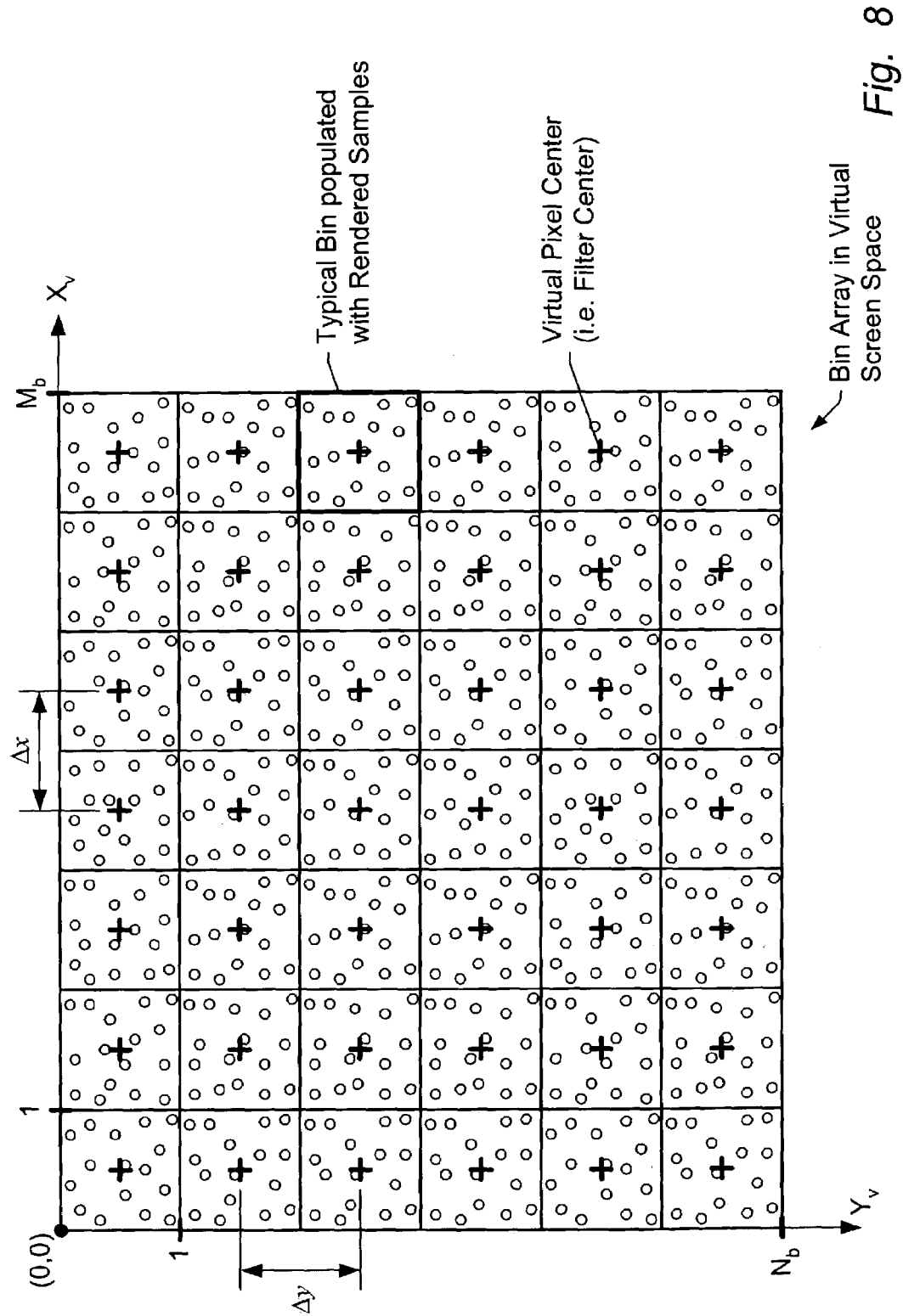
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement ΔX between successive virtual pixel positions in a row and vertical displacement ΔY between successive rows. The first virtual pixel position in the first row is controlled by a start position $(X_{start}, Y_{start})$. The horizontal displacement ΔX, vertical displacement ΔY and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement Δx and vertical displacement Δy may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
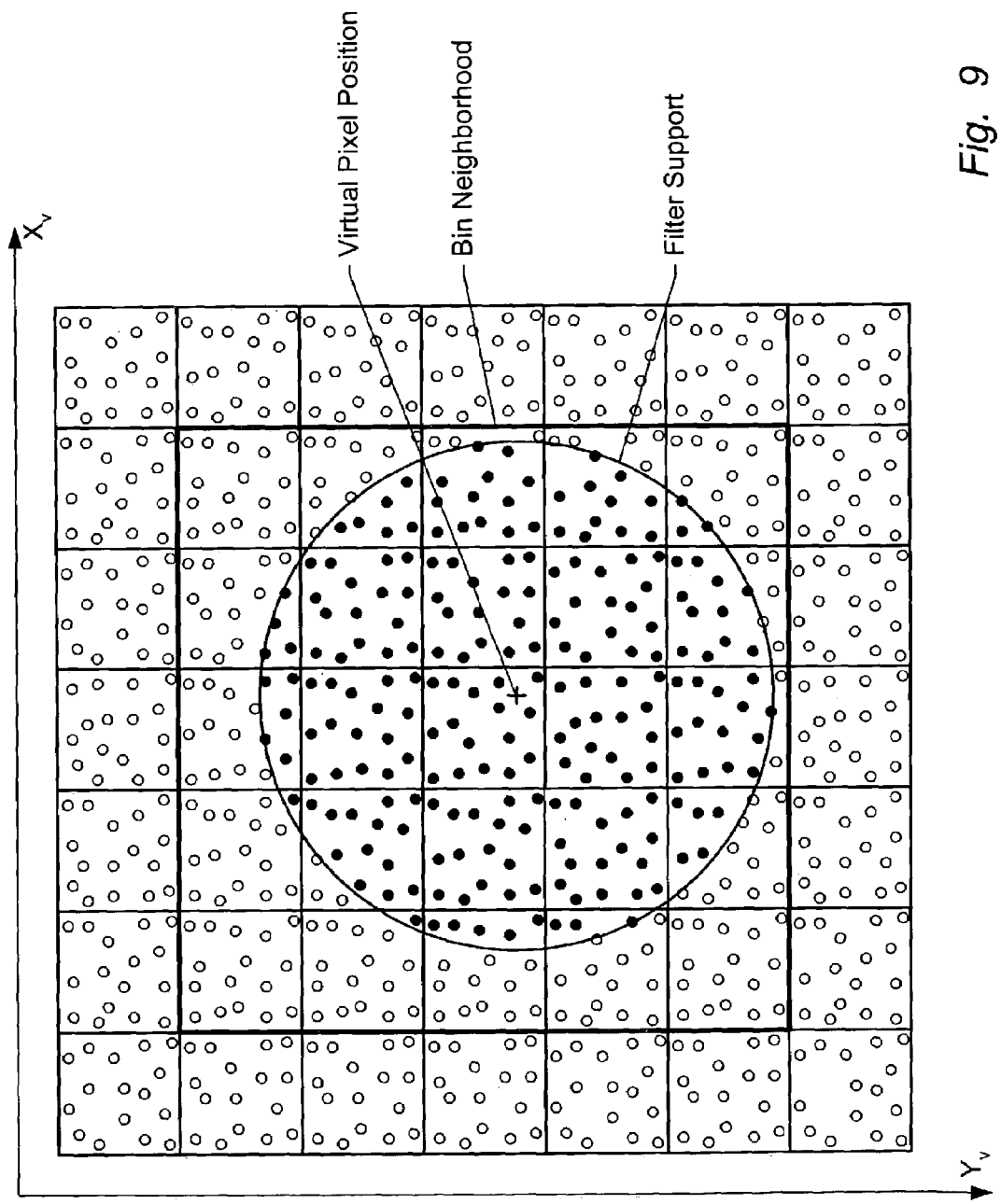
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D^S)^2$ of each sample position $(X_S,Y_S)$ in the bin neighborhood with respect to the virtual pixel position $(X_P,Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_s = (D_s)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$ and $Y_P-R_f$. Each sample S in the bin neighborhood may be marked as being valid if the sample's position $(X_S,Y_S)$ falls within the support square, i.e., if $X_P-R_f<X_S<X_P+R_f$ and $Y_P-R_f<Y_S<Y_P+R_f$.

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f$-1) operating in parallel, where the number $N_f$ of filtering units is a positive integer. For example, in one embodiment, $N_f$=4. In another embodiment, $N_f$=8.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f$=4 case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f$=4) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
```

```
        while (I<M_H(K) {
            PixelValues = Filtration(X_P, Y_P);
            Send PixelValues to Output Buffer;
            X_P = X_P+ΔX(K);
            I = I + 1;
        }
        X_P=X_start(K)
        Y_P=Y_P+ΔY(K);
        J=J+1;
    }
```

The expression Filtration($X_P$,$Y_P$) represents the filtration of samples in the filter support region of the current virtual pixel position ($X_P$,$Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
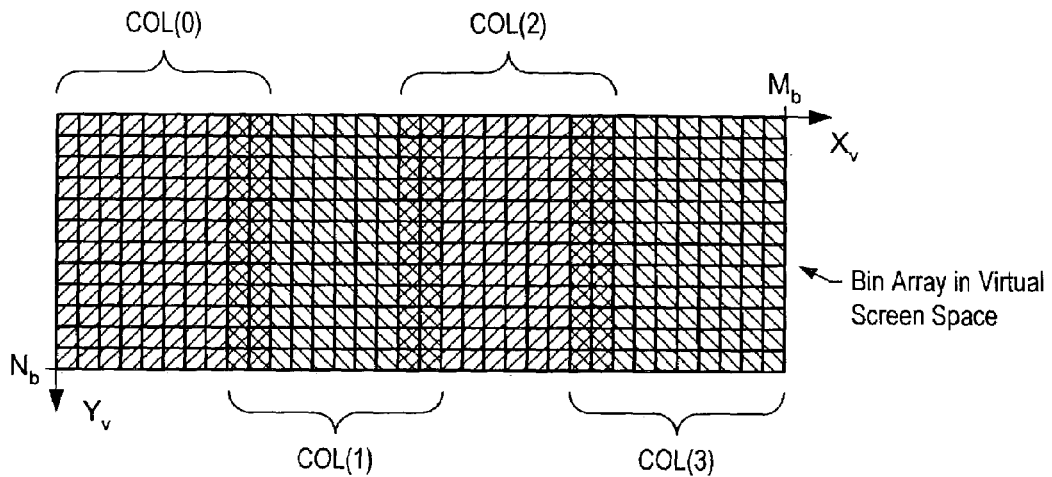
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
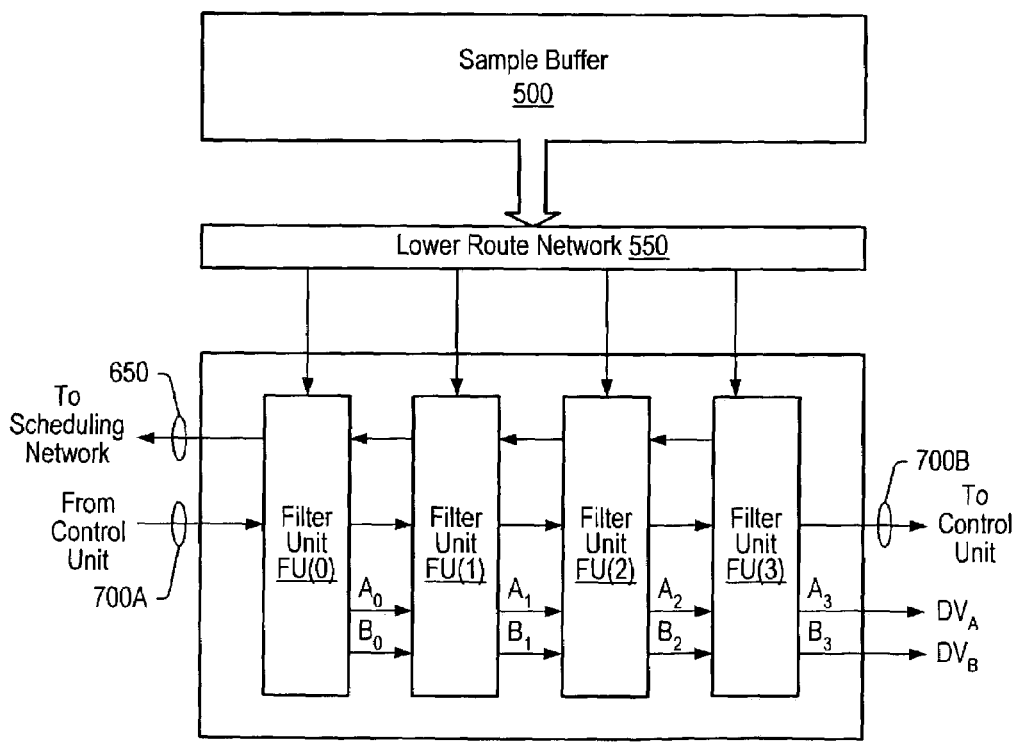
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f-1$), each filtering unit FU(K) may be configured to receive digital video input streams $A_{K-1}$ and $B_{K-1}$ from a previous filtering unit FU(K−1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f-1$) receives digital video streams $A_{N_f-2}$ and $B_{N_f-2}$ from the previous filtering unit FU($N_f-2$), and generates digital video output streams $A_{N_f-1}$ and $B_{N_f-1}$ also referred to as video streams $DV_A$ and $DV_B$ respectively. Video streams $A_0, A_1, \ldots, A_{N_f-1}$ are said to belong to video stream A. Similarly, video streams $B_0, B_1, \ldots, B_{N_f-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
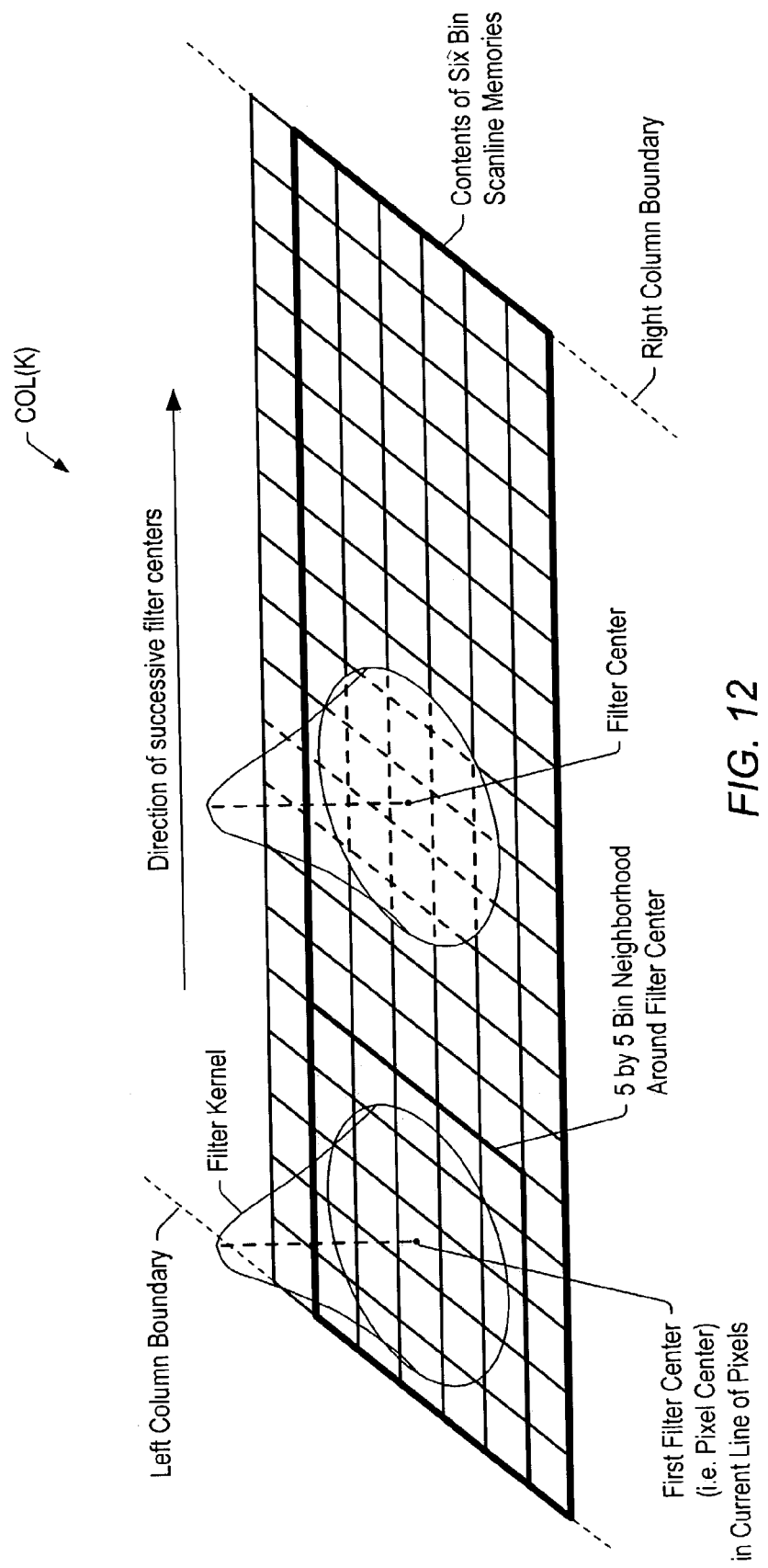
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement ΔY between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one or more larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement ($\Delta X, \Delta Y$) to the vector position ($X_{bin}, Y_{bin}$) of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements ($\Delta X, \Delta Y$). The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), . . . , MB($N_{MB-1}$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer),
30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
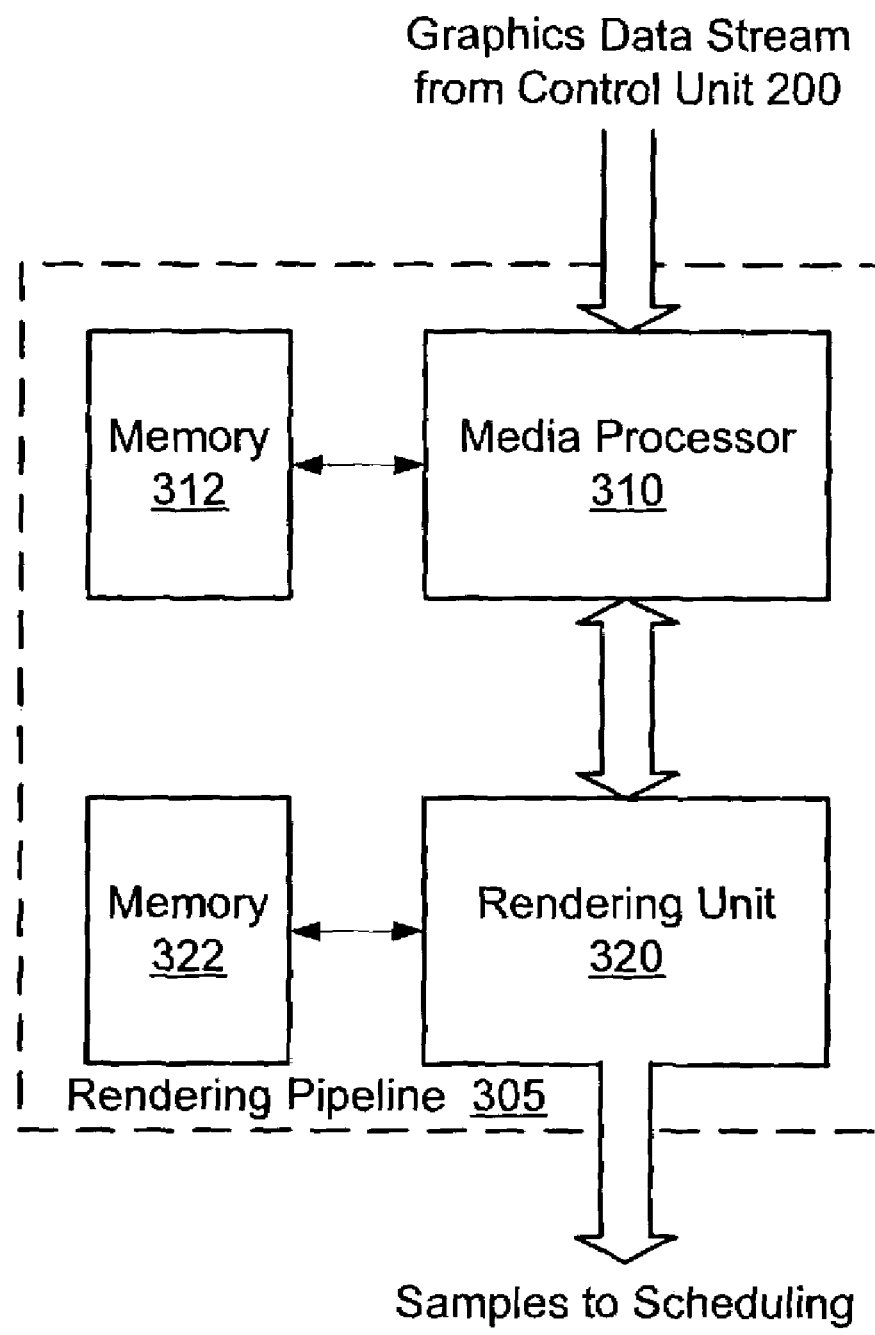
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}-1$). FIG. 13 illustrates one embodiment of a rendering pipeline 305 that may be used to implement each of the rendering pipelines RP(0), RP(1), . . . , RP($N_{PL}-1$). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
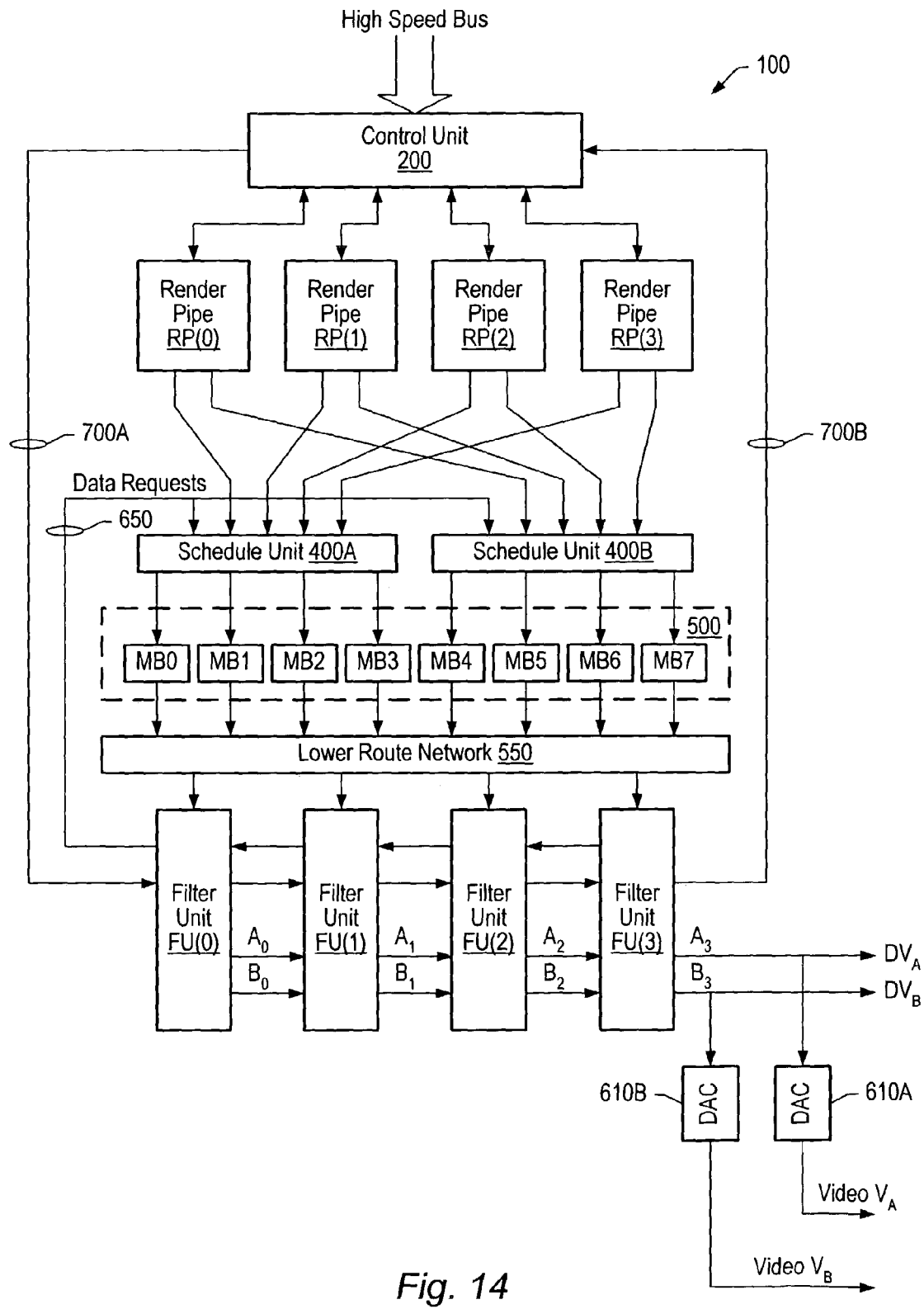
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
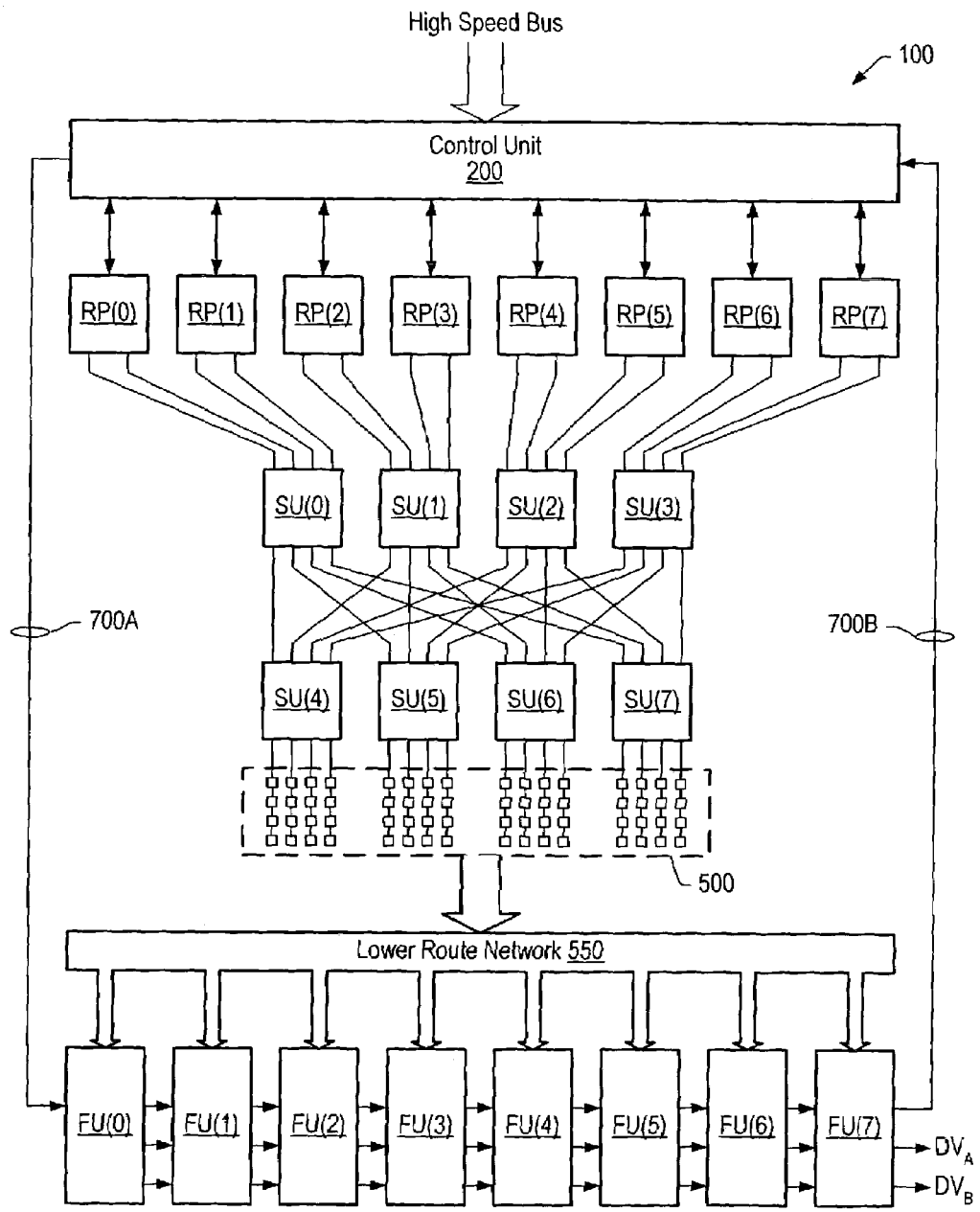
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Data Formats for Sample Color

In one set of embodiments, the color components of samples are stored in sample buffer 500 in a floating point format (e.g., IEEE floating point format).

In another set of embodiments, the color components of samples are stored in sample buffer 500 as stubby floating point quantities, i.e. as quantities having fewer mantissa bits and/or exponent bits than conventional IEEE floating point. For example, a stubby floating point quantity may have 8 or 12 bits of mantissa and 3 or 4 bits of exponent.

In yet another set of embodiments, the color components of samples may be stored in sample buffer 500 in a block floating point format. In the block floating point format, a scalar value may be represented by a mantissa M and an exponent factor F according to the expression $M*2^{(B*F)}$, where B is an integer constant greater than or equal to two.

In yet another set of embodiments, the color components of samples may be stored in sample buffer 500 in a controlled amplification format. The controlled amplification format includes an amplification control bit Y and N mantissa bits $X_1 X_2 X_3 \ldots X_N$, where N is a positive integer. Thus, a sample color component may be stored in sample buffer 500 using N+1 bits. The mantissa bits and the amplification control bit may represent the quantity $(2^{C*Y})*0.X_1 X_2 X_3 \ldots X_N$, where C is a positive integer. Thus, a sample color component which has the amplification control bit set to one will contribute $2^C$ times as much to a pixel color summation than if the amplification control bit were set to zero.

In various embodiments, parameter N may equal 8, 9, 10, 11 or 12, and parameter C may equal a value in the range from 1 to 12 inclusive. The parameters C and N may have different values for different color components. In one embodiment, parameter C may be user programmable.

When filtering engine 600 accesses a sample color component stored in the controlled amplification format from sample buffer 500, it may use the amplification control bit Y to control a conditional amplification operation on the mantissa bits. If the amplification control bit Y is equal to one, the filtering engine 600 may shift the mantissa bits, $X_1 X_2 X_3 \ldots X_N$, to the left C bit positions relative to an implied binary point. If the amplification control bit Y is equal to zero, the shift operation may be bypassed. Thus, the amplification control bit Y determines whether the mantissa bits get amplified by factor $2^C$.

In one embodiment, each color component has its own amplification control bit. In a second embodiment, one amplification control bit may control the amplification of all the color components of a sample. In a third embodiment, two amplification control bits may be used to control the amplification of three or more color components of the sample.

While amplification by a power of two is convenient, it is not required. In some embodiments, the mantissa bits and amplification control bit may represent the quantity $(Q^Y)*0.X_1 X_2 X_3 \ldots X_N$, where Q is a rational number greater than one.

A sample may be described as a super-intensity sample if one or more of the amplification control bits associated with the sample's color components are set equal to one (or, more generally, are set to an active state). More generally, in any of the data formats described herein, a sample is said to be a super-intensity sample if one or more of the sample's color components attains a value greater than a maximum displayable intensity value $K_{max}$. Super-intensity samples may be especially useful for the representation of one-dimensional and two-dimensional objects to provide extra stimulus to a down stream sample filter.

For zero-dimensional objects such as dots or one-dimensional objects such as line segments or curves, the controlled amplification format for sample color may allow for more efficient sample fill processing. To render a dot (e.g., a star in a night sky scene), a rendering pipeline RP(K) may:

(a) generate (or select) a sample position at (or near) the dot position, (b) set one or more of the amplification control bits of the corresponding sample, thereby distinguishing it as a super-intensity sample, and (c) store the super-intensity sample into the sample buffer 500.

The filtering process operating in filtering engine 600 spreads out the energy of the super-intensity sample over a neighborhood. If the filter support has a radius $R_f$ in virtual screen space, any pixel whose virtual pixel center falls in a disk of radius $R_f$ centered on the super-intensity sample position receives a contribution to one or more of its color value summations from the super-intensity sample. (That contribution may be a null contribution in cases where the filter kernel has one or more zero-crossings as a function of radius, as is typical when performing anti-aliasing, and where the distance of the super-intensity sample to the virtual pixel center equals the radius of one of the zero-crossings.) If other samples in the neighborhood of the super-intensity sample are all black (e.g., RGB=<0,0,0>), the filtered pixel intensities in the neighborhood of the super-intensity sample approximate the filter kernel (or, a scaled version of the filter kernel).

The parameter C may be chosen sufficiently large so that a single super-intensity sample provides sufficient stimulus on its own to the sample filter that one or more pixels thereby computed get turned fully.

As another example, to render a line segment, a rendering pipeline RP(K) may perform computations including:

(a) generating a series of sample positions along the line segment (or, near the line segment) defined by two endpoints A and B;

(b) setting one or more amplification control bits of the sample at each sample position (or of the sample at each sample position in a selected subset of the sample positions) of the series, thereby distinguishing the sample as a super-intensity sample; and (c) storing the series of super-intensity samples in the sample buffer 500.

Figure 16:
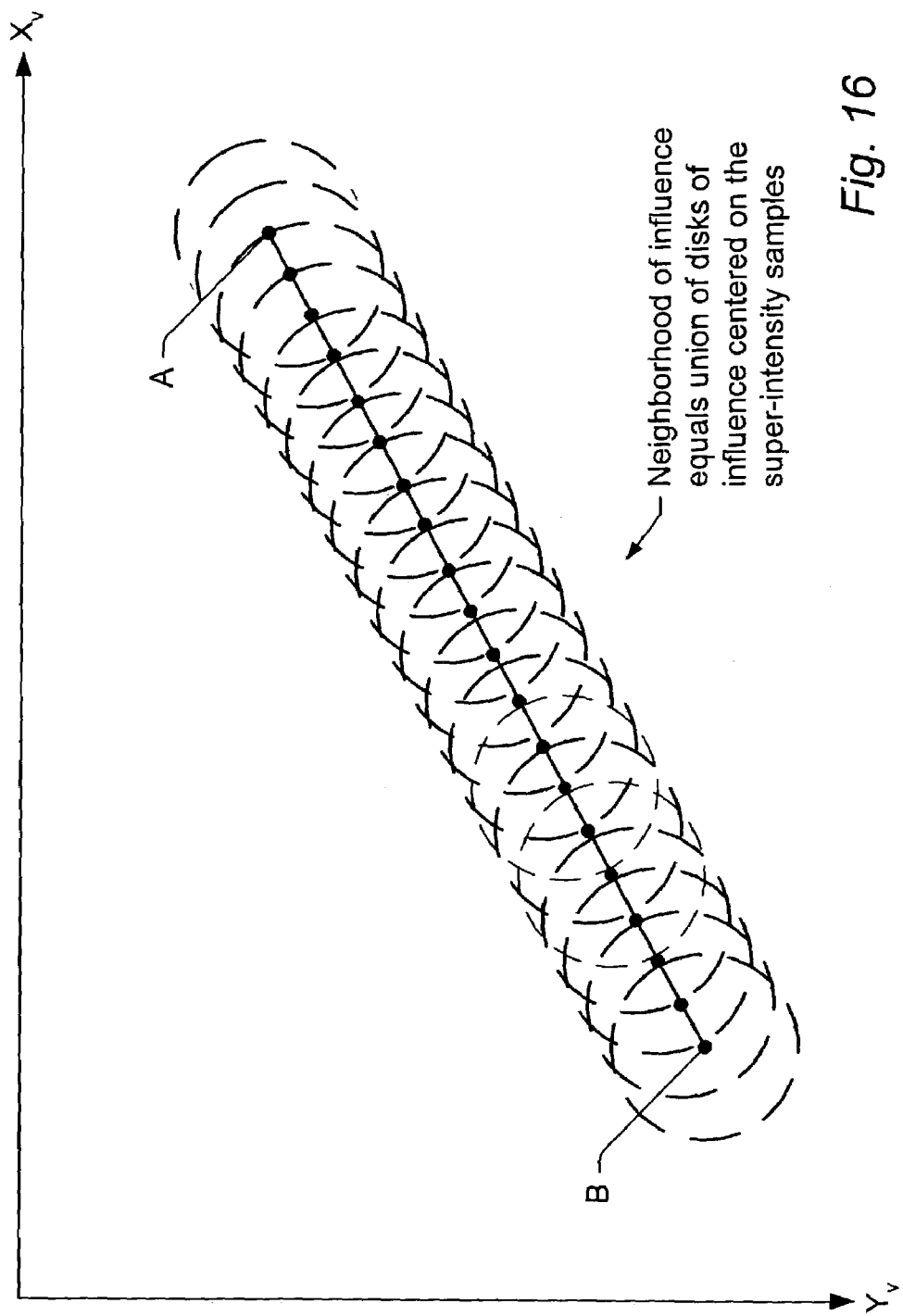
FIG. 16 illustrates a line segment represented by a series of superintensity samples.

The filtering process operating in filtering engine 600 spreads out the energy of the super-intensity samples over a neighborhood of the line segment as suggested by FIG. 16. If the filter support is a disk with radius $R_f$ in virtual screen space, each super-intensity sample has a disk of influence with radius $R_f$. Any pixel whose virtual pixel center falls in one or more of the influence disks receives a contribution to one or more of its color value summations from each of the corresponding super-intensity samples.

Because the filtering process spreads out the energy of the super-intensity samples, it is not necessary to perform anti-aliasing computations on zero-dimensional or one-dimensional objects prior to the storage of samples into the sample buffer 500. Thus, the controlled amplification format for the storage of sample color data allows a more accurate and efficient rendering of certain categories of graphical objects.

The floating point, stubby floating point and block floating point formats afford similar benefits at the expense of storing more lengthy exponents and/or mantissas in the sample buffer.

In one set of embodiments, a rendering pipeline RP(K) may use the block floating point format to store sample components (e.g., color values and alpha) in the sample buffer 500. Samples that represent one or two-dimensional objects may have their exponent factors F boosted up prior to storage into sample buffer 500 to induce extra stimulus to the sample filtering process which occurs down stream in filtering engine 600. For example, to render a dot, rendering pipeline RP(K) may:

(a) generate (or select) a sample position at (or near) the dot position,
(b) increase (or set) the exponent factor F of one or more of the sample components of the sample computed at the sample position, thereby distinguishing the sample as a super-intensity sample, and
(c) store the super-intensity sample into the sample buffer 500.

In some embodiments, the exponent factor F of a sample component may be increased (or set) so that the single super intensity sample provides (on its own) at least stimulus S* to the corresponding component summation, where S* is defined as the value that the corresponding component summation would attain under the condition that all the samples falling in the filter support have that sample component set to the maximum displayable intensity. For example, if the filter support is a square of side length four, the sample density equals 16 samples per bin, and the maximum displayable intensity is 1.0, then S* may equal $16*4^2=2^8=256$.

Filtering engine 600 may then read the samples which have been stored in block floating point format in sample buffer 500. Each mantissa M may be shifted E bits to the left where E equals C*F, where F is the exponent factor corresponding to mantissa M.

Sample positions are represented by quantities with finite word length, and thus, it is not generally possible to arrange for sample positions to lie exactly on an arbitrary mathematical curve (e.g., line segment). Therefore, in the discussion above, the sample positions "along the line segment" may be interpreted as numerical approximations of points on the line segment. In many embodiments, the sample positions along the line segment may be interpreted as sample positions that are as close as possible to the line segment given the current value of the sample density $N_{s/b}$ and/or the current sample positioning pattern. In some embodiments, the current sample positioning pattern may be determined by the set of sample position displacements written into the programmable jitter table, and the spatial structure of the geometric permutations that are applied to the displacements.

Filtering engine 600 may clamp pixel color values X (e.g., red, green and blue) to a displayable range $[K_{min}, K_{max}]$ in preparation for output:

$$X_{out} = \begin{cases} K_{max}, & \text{if } X > K_{max} \\ X, & \text{if } K_{min} \leq X \leq K_{max} \\ K_{min}, & \text{if } X < K_{min} \end{cases}$$

where $K_{min}$ corresponds to a minimum displayable color intensity for a pixel, and $K_{max}$ corresponds to a maximum displayable color intensity for a pixel. For example, $K_{min}$ may equal zero, and $K_{max}$ may equal 0.111 . . . 111 (i.e., a fixed point quantity with all bits to the right of the binary point set equal to one).

The filtering process may be configured to have a unity gain. (See, e.g., the above discussion on post-summation color normalization.) Thus, if all the samples in the filter support region have color intensities in the displayable range, the resulting pixel color values will lie within the displayable range. However, it is not always convenient or even desirable to arrange the elements of a scene so that all rendered samples have color intensities within the displayable range. Light sources may be very bright. Objects may be positioned close to light sources. Objects may have surfaces which exhibit highly specular reflection. Such events may give rise to sample color intensities which exceed the maximum displayable intensity $K_{max}$.

In one embodiment, sample colors may be computed as floating point values, and thus, may greatly exceed the maximum displayable intensity $K_{max}$. In another embodiment, sample colors may be computed as fixed point quantities with the binary digits to the left of the binary point corresponding to intensities above the maximum displayable value $K_{max}=0.111\ldots111$.

As mentioned above, the conditional amplification format may be used for the storage of sample color components in sample buffer 500. When a rendering pipeline RP(K) computes a color component K of a sample S which exceeds the maximum displayable value $K_{max}$ the rendering pipeline may select values for the amplification control bit Y and the mantissa bits $X_1 X_2 X_3 \ldots X_N$ so that the represented value $(2^{C*Y})*0.X_1 X_2 X_3 \ldots X_N$ achieves an approximation (e.g., the closest available approximation) to the value of the computed sample color component K.

Automatic Gain Control

Figure 17A:
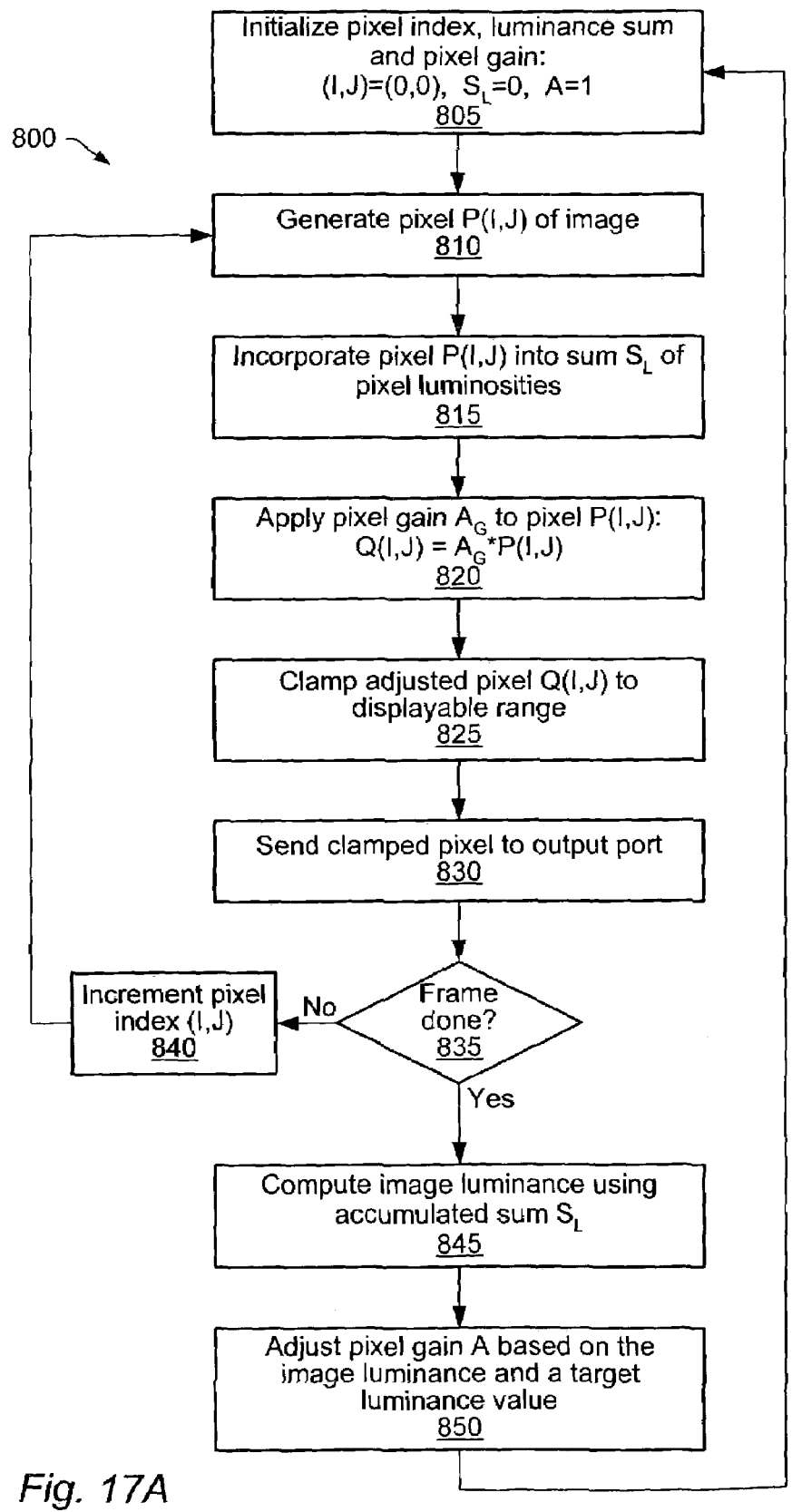
FIG. 17A illustrates one embodiment of a method for performing automatic gain control on the color intensity or luminance of video pixels.

In one set of embodiments, filtering engine 600 may be configured to perform automatic gain control on computed pixel color intensities according to the method 800 suggested by FIG. 17A.

In step 805, filtering engine 600 may initialize a two-dimensional pixel index (I,J) to correspond to a first pixel in a first line of a current frame, initialize a sum $S_L$ of pixel luminances to zero, and initialize a pixel gain $A_G$ to one.

In step 810, filtering engine 600 may generate a pixel P(I,J) in the current frame by filtering a set of samples accessed from sample buffer 500 as described variously above.

In step 815, filtering engine 600 may incorporate a luminance of the pixel P(I,J) into a sum $S_L$ of pixel luminances:

$$S_L = S_L + |P(I,J)|$$

where |P(I,J)| denotes the luminance of pixel P(I,J). Any of various transformations may be used to compute the luminance of pixel P(I,J) from the color components of pixel P(I,J). For example, a linear combination of the form $$|P(I,J)| = C_R * R + C_G * G + C_B * B$$

may be used to compute the pixel luminance, where R, G and B are the red, green and blue components of the pixel P(I,J), and $C_R$, $C_G$ and $C_B$ are corresponding coefficients. In one embodiment, the transformation from color components to pixel luminance may be the standard CIE transformation. CIE is an abbreviation for the Commission Internationale de l'Eclairage (i.e., the International Commission on Illumination).

In various other embodiments, the luminance of pixel P(I,J) may be the sum of its color components, the sum of the absolute values of its color components, the square root of the sum of squares of its color components, the maximum of its color components, the maximum of the absolute values of its color components, or, the median of the absolute values of its color components, the mean of the absolute values of the color components, a weighted average of the absolute values of the color components, etc.

In step 820, filtering engine 600 may apply the pixel gain $A_G$ to the color components of pixel P(I,J) to generate an adjusted pixel Q(I,J). For example, the color components of pixel P(I,J) may be multiplied by pixel gain $A_G$ to obtain the color components of the adjusted pixel Q(I,J).

In step 825, filtering engine 600 may clamp the color components of the adjusted pixel Q(I,J) to a displayable range, e.g., the interval [0,1), thus obtaining a clamped pixel R(I,J).

In step 830, filtering engine 600 may send the clamped pixel R(I,J) to an output port for display on a display device. In transit to the output port, the clamped pixel may be subjected to a γ correction transformation.

In step 835, filtering engine 600 may determine if the current frame is complete, i.e., if all the pixels in the current frame have been computed. If the current frame is not yet complete, filtering engine 600 may increment the pixel index (I,J) to point to a next pixel of the current frame as indicated by step 840, and then proceed to step 810. If the current frame is complete, filtering engine 600 may proceed to step 845.

In step 845, filtering engine 600 may compute an image luminance using the accumulated sum $S_L$. In one embodiment, the image luminance may be computed by multiplying the sum $S_L$ by a reciprocal of the number of pixels in the frame. In a second embodiment, the image luminance may be computed by shifting the binary digits of the sum $S_L$ a number of digits to the right to effect a division by a power of two. In a third embodiment, the image luminance may be identical to the sum $S_L$, and thus, no computation is necessary.

In step 850, filtering engine 600 may adjust the pixel gain $A_G$ based on the image luminance and a target luminance. The target luminance may be user programmable parameter. In some embodiments, the user may dynamically control the target luminance.

The pixel gain $A_G$ may be adjusted by an amount that depends on the difference between the image luminance and the target luminance. For example, in one embodiment the pixel gain may be adjusted according to the relation $$A_G = A_G - k_A * (\text{image luminance} - \text{target luminance}).$$

The adaptation rate parameter $k_A$ may be user programmable. After adjusting the pixel gain, filtering engine 600 may start processing the next frame by proceeding to step 805. Thus, a pixel gain computed in response to measurements on a current frame is applied to the next frame.

In one set of embodiments, filtering engine 600 may apply a temporal filter (e.g., a finite impulse response filter, or an infinite impulse response filter) to smooth the sequence of pixel gains $A_G$ generated in successive iterations of step 850. Thus, a filtering step may intervene between step 850 and step 805, and the pixel gain applied in step 820 may be the filtered gain. The filtering may prevent the applied gain from changing too rapidly from one frame to the next.

In some embodiments, filtering engine 600 may develop luminance sum $S_L$ over a subset LSS of the pixels in a frame. Thus, the filtering engine 600 may perform the accumulate operation $S_L = S_L + |P(I,J)|$ only when pixel index (I,J) resides in the subset LSS. In one embodiment, the subset LSS may be a convex region such as a rectangle or circular disk centered within the frame.

In one embodiment, filtering engine 600 may generate a histogram of the pixel luminances in each frame. One or more statistics gathered from the histogram may control the adjustment of the pixel gain $A_G$. In this embodiment, step 815 may incorporate the luminance of pixel P(I,J) into a histogram of pixel luminances, step 845 may compute the one or more statistics from the histogram, and step 850 may adjust the pixel gain $A_G$ based on the one or more statistics. Statistics may include values such as the mean, median, standard deviation, maximum and minimum of the histogram distribution. One statistic that may be of value is the pixel luminance $L_X$ such that 100*X percent of the histogram population has pixel luminance less than or equal to $L_X$, where X is a value in the range from zero to one inclusive. X may be programmable parameter.

As described above, filtering engine 600 may include a series of filtering units FU(K) that partition the effort of generating the $M_P \times N_P$ array of pixels in each frame. Each filtering unit FU(K) is programmed to generate pixels for a corresponding subset SS(K) (e.g., a vertical stripe) of the pixel array in each frame. The series of filtering units may implement automatic gain control as follows.

Each filtering unit FU(K) may apply a global pixel gain $A_G$ to pixels of the corresponding subset SS(K) and accumulate a local sum LS(K) of pixel luminances over the corresponding subset SS(K), or, some portion of the corresponding subset SS(K). After having generated the pixels for the corresponding subset SS(K), filtering unit FU(K) may communicate the local sum LS(K) to a central gain adjustment unit. The central gain adjustment unit may add up the local sums to determine a global sum of pixel luminance: GS=LS(0)+LS(1)+...+LS($N_f$–1), where $N_f$ is the number of filtering units. The global sum GS may be used to compute an image luminance IL. The central gain adjustment unit may adjust the global pixel gain $A_G$ based on the image luminance IL and a target luminance TL, and then, broadcast the adjusted global pixel gain $A_G$ to all the filtering units. Each filtering unit FU(K) may store the global pixel gain $A_G$, and apply the global pixel gain to pixels in the next frame.

In one embodiment, the central gain adjustment unit may reside in the first filtering unit FU(0). In another embodiment, each filtering unit FU(K) includes a central gain adjustment unit which may be programmably enabled or disabled. Host software may enable the central gain adjustment unit in one of the filtering units (e.g., the first filtering unit FU(0)) and disable the central gain adjustment unit in the other filtering units.

Figure 17B:
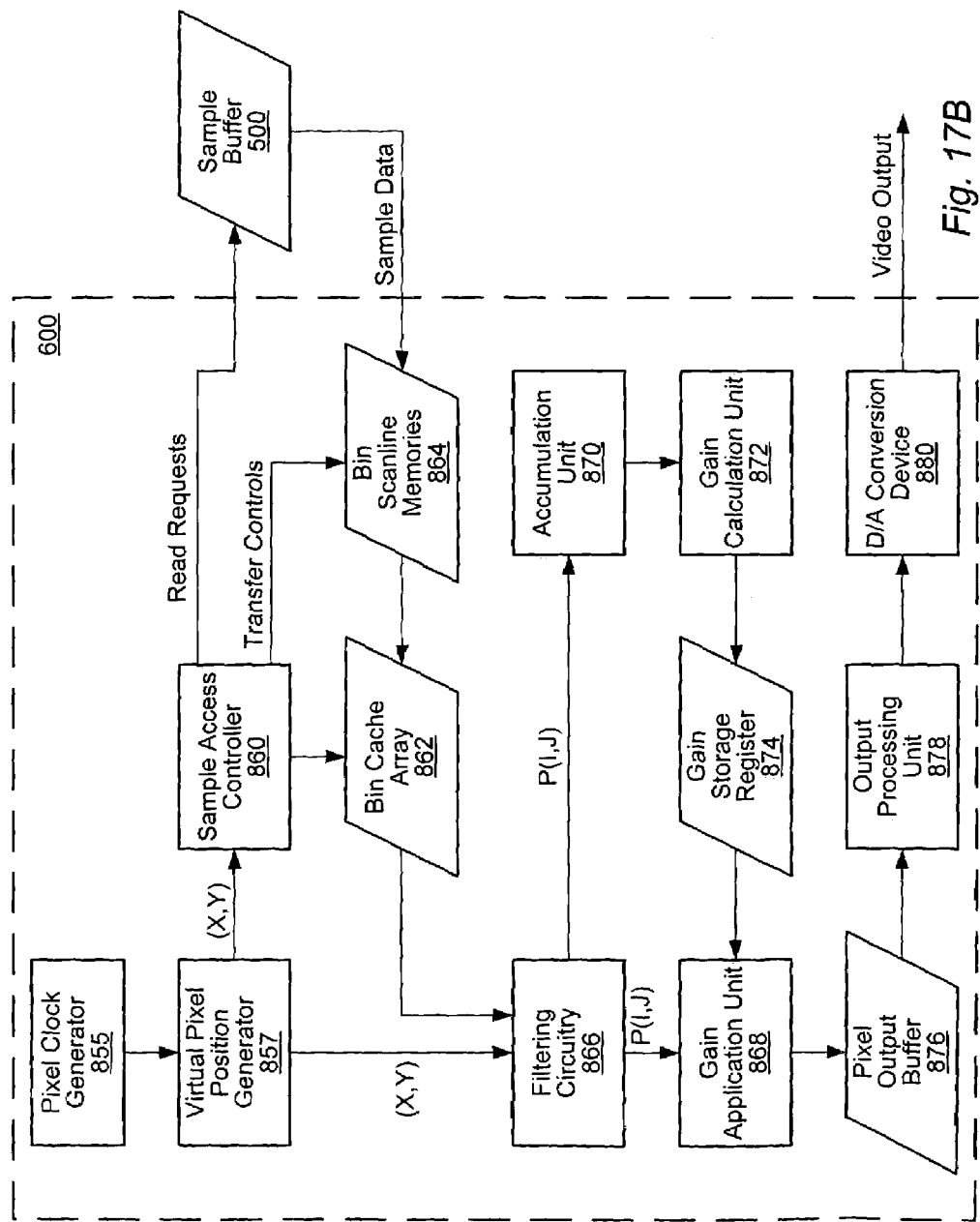
FIG. 17B illustrates one embodiment of a filtering engine configured to perform automatic gain control.

FIG. 17B illustrates one embodiment of filtering engine 600 configured to perform automatic gain control on pixels (e.g., pixel colors or pixel luminances). Filtering engine 600 may include a pixel clock generator 855, a virtual pixel position generator 857, a sample access controller 860, a bin cache array 862, bin scanline memories 864, filtering circuitry 866, gain application unit 868, accumulation unit 870, gain calculation unit 872, gain storage register 874, pixel output buffer 876, output processing unit 878 and an analog to digital conversion device 880.

Pixel clock generator 855 generates a pixel clock signal. The frequency of the pixel clock signal may be programmable. Virtual pixel position generator 857 may generate an array of virtual pixel positions in virtual screen space in a raster fashion. Each virtual pixel position (X,Y) may be generated in response to a transition of the pixel clock. The horizontal displacement $\Delta X$ and vertical displacement $\Delta Y$ between virtual pixel positions and the start position ($X_{start}$, $Y_{start}$) of the array of virtual pixel positions are user programmable. Virtual pixel position generator 857 may include circuitry which control the progress of the horizontal and vertical pixel indices I and J.

Sample access controller 860 controls the flow of bins of samples from sample buffer 500 to bin scanline memories 864, and from bin scanline memories 864 to bin cache array 862 based on the virtual pixel position (X,Y).

Filtering circuitry 866 computes the color components of pixel value P(I,J) at virtual pixel position (X,Y) based on the samples which have been loaded into bin cache array 862. Filtering circuitry 866 may include a programmable filter coefficient table, circuitry for computing sample radii with respect to the virtual pixel position, a network of multipliers, adders and accumulators for developing weighted sums of sample color values, and normalization circuitry. The color components of pixel P(I,J) may be transferred to gain application unit 868 and to accumulation unit 870.

Gain application unit 868 applies the pixel gain $A_G$ stored in gain storage register 874 to the color components of the pixel P(I,J) to obtain an adjusted pixel Q(I,J). In one alternative embodiment, gain application unit 868 converts the pixel P(I,J) into YUV format and applies the pixel gain A to the luminance component Y.

Gain application unit 868 may clamp the color components of the adjusted pixel Q(I,J) to generate a clamped pixel as indicated in step 825 of FIG. 17A, and forward the clamped pixel to pixel output buffer 876. Output processing unit 878 may read the pixels from pixel output buffer 876, perform $\gamma$ correction (and perhaps other processing operations) on the pixels, and forward the corrected pixels to a digital-to-analog conversion device 880. Digital-to-analog conversion device 880 may convert the stream of pixels from output processing unit 878 into an analog video signal.

Accumulation unit 870 may incorporate the luminance of the pixel P(I,J) into the sum $S_L$ of pixel luminances as described above. In some embodiments, accumulation unit 870 may include windowing circuitry which determines if the pixel index (I,J) falls within a user defined subset (e.g., a rectangular window) of the frame. The result of this determination may control if the pixel P(I,J) is incorporated into the sum $S_L$. Gain calculation unit 872 may compute an image luminance value IL based on the sum $S_L$ after the current frame of pixels has been generated, and update the pixel gain $A_G$ using the image luminance IL. The updated pixel gain $A_G$ may be stored into gain storage register 874.

In one alternative embodiment, accumulation unit 870 may incorporate the luminance of the pixel P(I,J) into a histogram of pixel luminances. Gain calculation unit 872 may analyze the histogram to determine a set of statistics from the histogram, and compute the updated pixel gain $A_G$ based on the set of statistics.

Dynamic Range Compression

Figure 18:
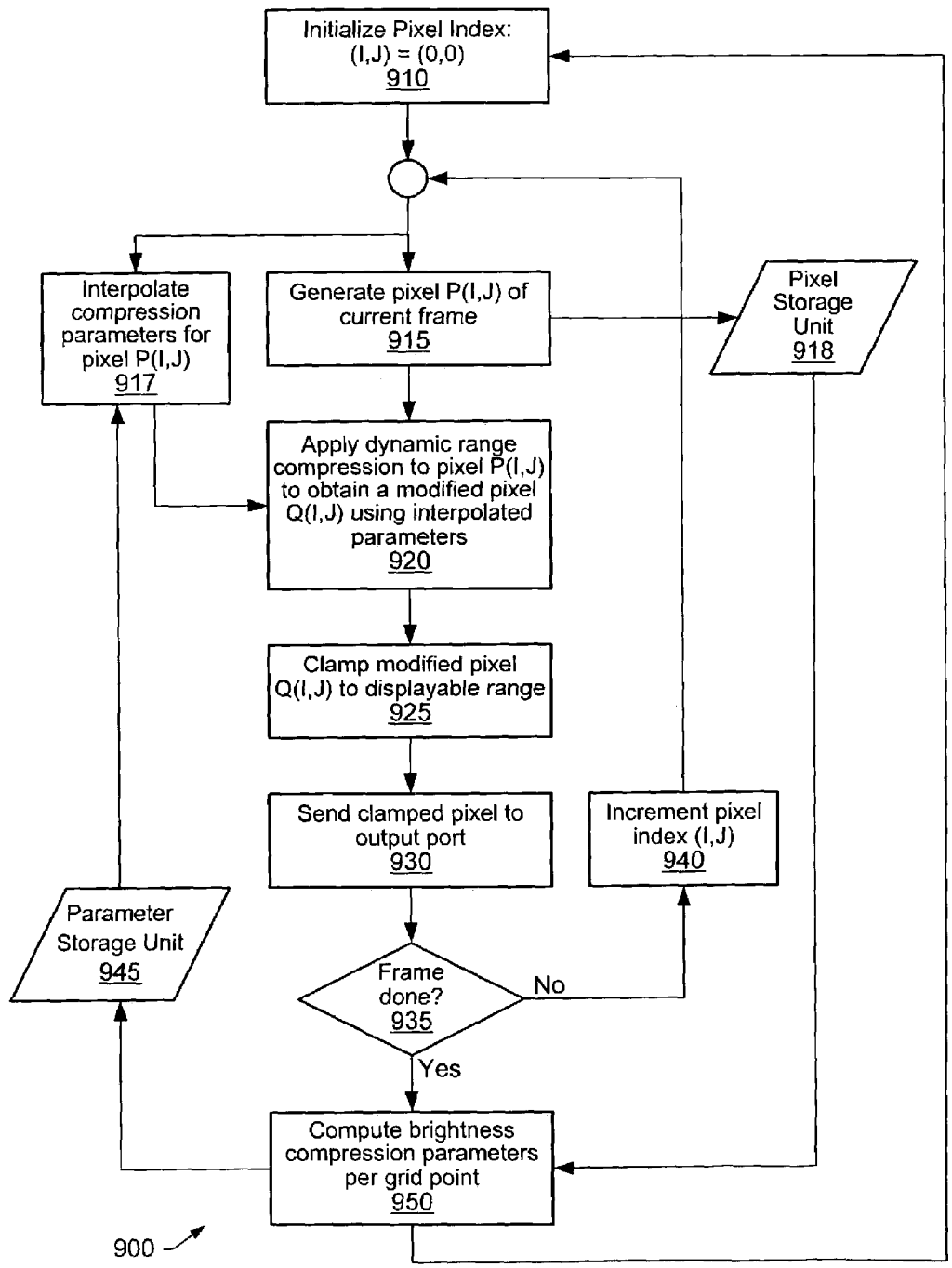
FIG. 18 illustrates one embodiment of a method for performing dynamic range compression on video pixels.

In one set of embodiments, filtering engine 600 may be configured to perform dynamic range compression on computed pixel color intensities according to the method 900 suggested by FIG. 18.

In step 910, filtering engine 600 may initialize a pixel index (I,J) to correspond to a first pixel of a current frame (e.g., the first pixel of the first line in the current frame).

In step 915, filtering engine 600 may generate a pixel P(I,J) of the current frame by filtering samples accessed from sample buffer 500 as described variously above. The pixel P(I,J) may be stored in pixel storage unit 918.

Figure 19:
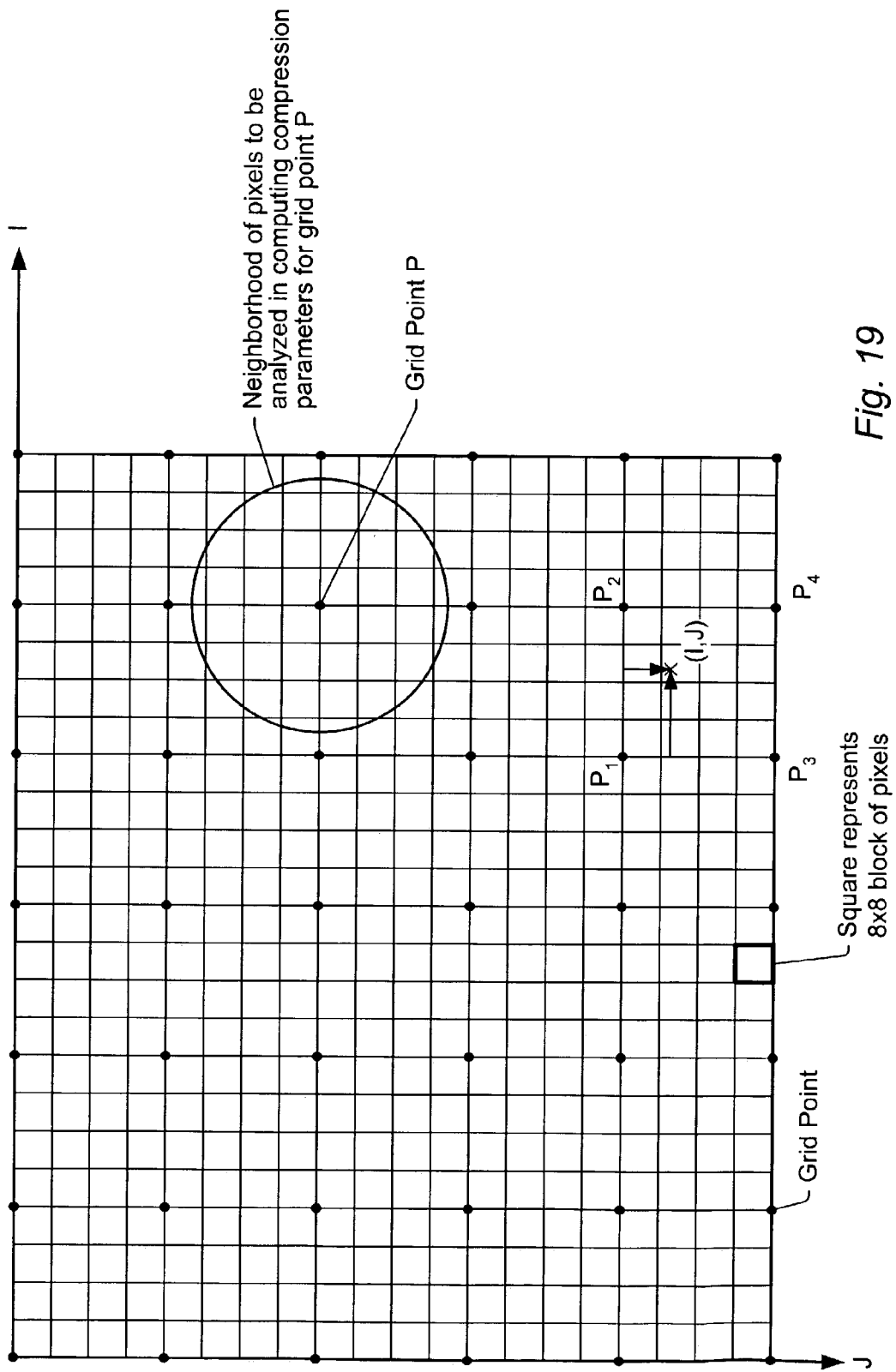
FIG. 19 illustrates a frame of pixels and a grid of pixel positions within the frame where compression parameters may be computed.

Parameter storage unit 945 may store a compression parameter vector for each position in a grid G of pixel positions that cover the frame (or some portion of the frame). For example, the grid may comprise positions (K,L) where K is a multiple of $N_X$ and L is a multiple of $N_Y$, where $N_X$ and $N_Y$ are positive integers greater than or equal to two as suggested by FIG. 19. $N_X$ and $N_Y$ may be user programmable parameters. In one set of embodiments, $N_X=N_Y=N_{Side}$, where $N_{Side}=8$, 16, 32, 64, or 128. In other embodiments, $N_X$ and $N_Y$ are unequal. FIG. 19 illustrates the $N_X=N_Y=N_{Side}=32$ case as each small square represents an 8×8 block of pixels.

In step 917, filtering engine 600 may access one or more compression parameter vectors from parameter storage unit 945, and interpolate a compression parameter vector appropriate for pixel index (I,J). For example, the interpolation may be a bilinear interpolation of the compression parameter vectors at the four grid positions neighboring pixel index (I,J). FIG. 19 presents an example of the four grid points $P_1$, $P_2$, $P_3$ and $P_4$ neighboring a particular pixel index (I,J). Step 915 and 917 may be performed in parallel in some embodiments. Any of various interpolation techniques are contemplated.

In step 920, filtering engine 600 performs a dynamic range compression operation on the color components of pixel P(I,J) using the interpolated parameter vector. This dynamic range compression operation results in a modified pixel Q(I,J).

In step 925, filtering engine 600 may clamp the color components of the modified pixel Q(I,J) to a displayable range, e.g., the interval [0,1), thus obtaining a clamped pixel R(I,J).

In step 930, filtering engine 600 sends the clamped pixel R(I,J) to an output port for display on a display device. In transit to the output port, the clamped pixel R(I,J) may be subjected to $\gamma$ correction.

In step 935, filtering engine 600 may determine if the current frame is complete, i.e., if all the pixels in the current frame have been computed. If the current frame is not yet complete, filtering engine 600 may increment the pixel index (I,J) to point to a next pixel of the current frame, and then continue processing at steps 915 and 917. If the current frame is complete, filtering engine 600 may proceed to step 950.

In step 950, filtering engine 600 may compute a vector (or set) $V_P$ of dynamic range compression parameters for each point P in the grid G. The computation of the vector $V_P$ may involve the analysis of pixels P(I,J) in a neighborhood of grid point P as suggested by FIG. 19. The neighborhood may be a rectangle, circular disk, or more generally, a convex region centered on the grid point P. The radius $R_N$ of the neighborhood may be a user programmable parameter. In some embodiments, filtering engine 600 may develop a histogram of the luminances of pixels in the neighborhood and compute one or more statistics from the histogram, e.g., statistics such as the maximum, minimum, mean, median, standard deviation, etc. Histogram statistics may be used to compute the vector of dynamic range compression parameters for grid point P. The vectors $V_P$ for the grid points P may be stored in parameter storage unit 945.

After step 950, filtering engine 600 may advance to step 910 to set up for processing the next frame. The compression parameter vectors computed in step 950 may be applied to the pixels of the next frame.

In one embodiment of step 950, filtering engine 600 may compute a value $L_{X1}$ and a value $L_{X2}$ from the histogram, where $L_X$ is the pixel luminance such that 100*X percent of the pixels in the histogram population have luminance less than or equal to $L_X$. The values X1 and X2 may be user programmable. X1 may equal some number close to zero, and X2 may be a number close to one. For example, X1 may equal 0.05 and X2 may equal 0.95. As another example, X1 may equal 0.01 and X2 may equal 0.99. Thus, the compression parameter vector $V_P$ may comprise $L_{X1}$ and $L_{X2}$.

In step 917, $L_{X1}$ and $L_{X2}$ may be interpolated to pixel index (I,J). The interpolated values $L_{X1}(I,J)$ and $L_{X2}(I,J)$ may be used (in step 920) to modify the color components of the pixel P(I,J). For example, each of the color components of the pixel P(I,J) may be modified according to the relation.

ModifiedColor=(Color−$L_{X1}(I,J)$)/($L_{X2}(I,J)$−$L_{X1}(I,J)$).

In one alternative embodiment, the color components of pixel P(I,J) are converted to YUV format prior to modification, and then, the modification is applied the luminance component Y according to the relation ModifiedY=(Y−$L_{X1}(I,J)$)/($L_{X2}(I,J)$−$L_{X1}(I,J)$).

Filtering engine 600 may be programmed to convert the modified Y and unmodified U and V components back to RGB to support an RGB display device.

In other embodiments, filtering engine 600 may apply a higher order polynomial transformation to the pixel color components (or luminance component) in step 920 instead of an affine transformation.

In some embodiments, filtering engine 600 may compute a gradient field on the pixel luminances |P(I,J)| as part of the computations in step 950. Large magnitude gradients indicate rapid changes in pixel luminance. Filtering engine 600 may incorporate information about the gradient field into the computation of the compression parameter vectors at the grid points of grid G.

The embodiment of FIG. 18 defers computation of compression parameter vectors (step 950) until after the current frame has been completed. In another embodiment, the computation of the compression parameter vectors may be performed as the current frame is being developed. The compression parameter vectors for the $K^{th}$ line of points in grid G may use the $2R_N$ lines of pixels from the current frame which are vertically centered on the $K^{th}$ grid line. Thus, it is not necessary to wait until after the current frame is complete to begin computation of compression parameter vectors. A pixel storage unit 918 with sufficient capacity to store $2R_N+N_Y$ pixel lines would allow filtering engine 600 to concurrently (a) read pixels from $2R_N$ of the storage lines in the pixel storage unit 918 to support compression parameter computations for the $K^{th}$ grid line and (b) write pixels to the remaining $N_Y$ storage lines in the pixel storage unit in anticipation of compression parameter computations for the $(K+1)^{st}$ grid line. Therefore, in this embodiment, the pixel storage unit 918 may be significantly smaller than in the embodiment of FIG. 18, and the compression parameter vectors for the whole frame may be available soon after the last few lines of pixels in the frame have been generated.

Figure 20:
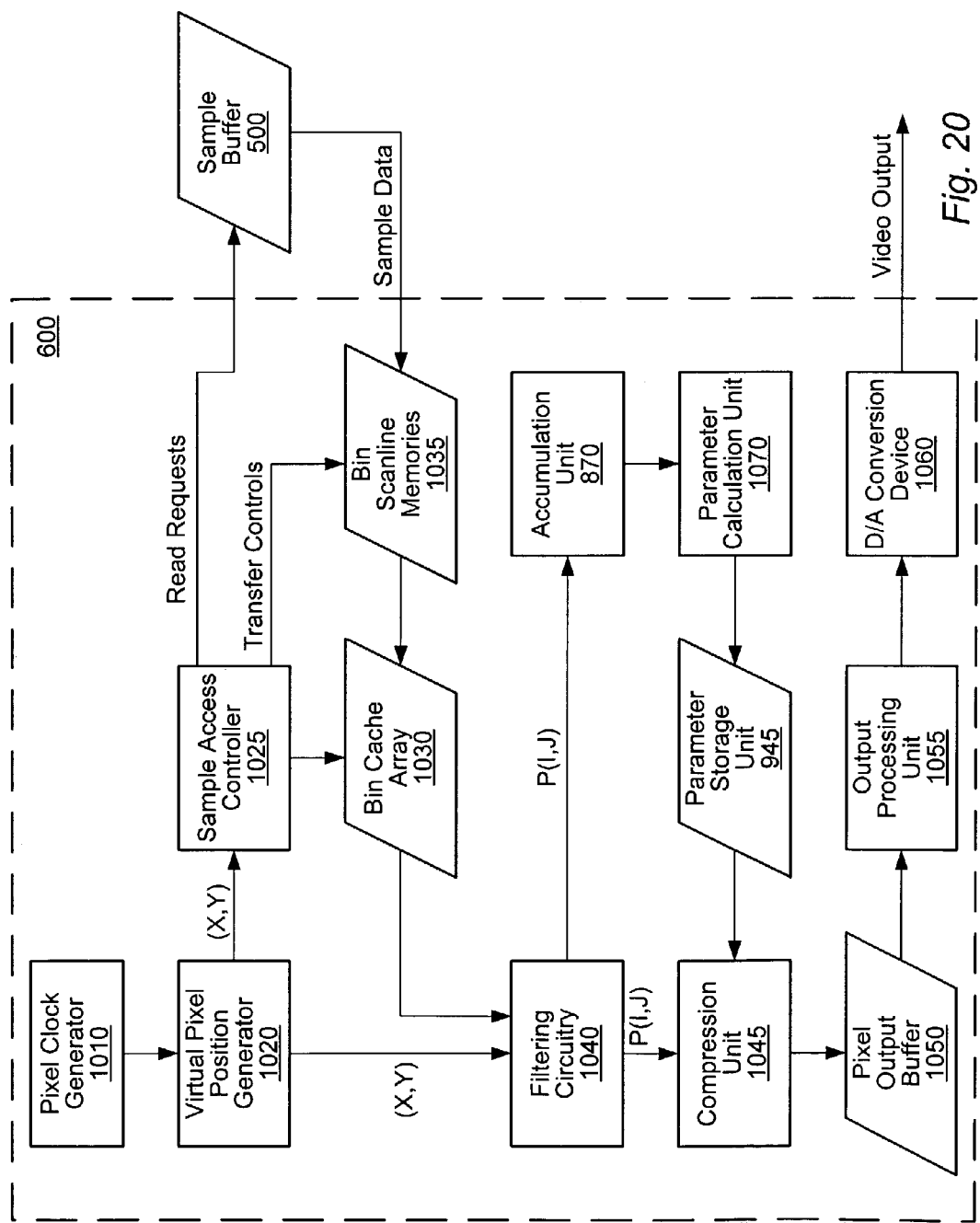
FIG. 20 illustrates one embodiment of a filtering engine configured to perform dynamic range compression on video pixels.

FIG. 20 illustrates one embodiment of filtering engine 600 configured to perform dynamic range compression on pixels (e.g., pixel colors or pixel luminances). Filtering engine 600 may include a pixel clock generator 1010, a virtual pixel position generator 1020, a sample access controller 1025, a bin cache array 1030, bin scanline memories 1035, filtering circuitry 1040, pixel storage unit 918, compression unit 1045, a pixel output buffer 1050, an output processing unit 1055, and an analog to digital conversion unit 1060.

Pixel clock generator 1010 generates a pixel clock signal. The frequency of the pixel clock signal may be programmable. Virtual pixel position generator 1020 may generate an array of virtual pixel positions in virtual screen space in a raster fashion. Each virtual pixel position (X,Y) may be generated in response to a transition of the pixel clock. The horizontal displacement ΔX and vertical displacement ΔY between virtual pixel positions and the start position ($X_{start}$, $Y_{start}$) of the array of virtual pixel positions are user programmable. Virtual pixel position generator 1020 may include circuitry which controls the raster progression of the horizontal and vertical pixel indices I and J.

Sample access controller 1025 controls the flow of bins of samples from sample buffer 500 to bin scanline memories 1035, and from bin scanline memories 1035 to bin cache array 1030 based on the virtual pixel position (X,Y).

Filtering circuitry 1040 computes the color components of pixel value P(I,J) at virtual pixel position (X,Y) based on the samples which have been loaded into bin cache array 1030. Filtering circuitry 1040 may include a programmable filter coefficient table, circuitry for computing sample radii with respect to the virtual pixel position, a network of multipliers, adders and accumulators for developing weighted sums of sample color values, and normalization circuitry. The color components of pixel P(I,J) may be forwarded to compression unit 1045 and also stored into pixel storage unit 918.

Compression unit 1045 may read one or more compression parameter vectors from parameter storage unit 945, interpolate a compression parameter vector for the current pixel P(I,J) as indicated in step 917, and apply a dynamic range compression operation on the current pixel P(I,J) using the interpolated compression parameter vector as indicated in step 920. Compression unit 1045 may clamp the compressed pixel to generate a clamped pixel Q(I,J) as indicated in step 930, and forward the clamped pixel to pixel output buffer 1050. Pixels from the pixel output buffer 1050 may be further processed (e.g., γ corrected) in output processing unit 1055 and then forwarded to a digital to analog conversion device 1060. Digital to analog conversion device 1060 may convert the stream of pixels generated by output processing unit 1055 into an analog video output signal.

Parameter calculation unit 1070 may compute the compression parameter vectors at points P of the grid G. Parameter calculation unit 1070 may be configured to perform the vector computations after completion of a frame as suggested by step 950 of FIG. 18, or alternatively, while the frame is being generated as described above.

Numerous variations and modifications will become apparent to those skilled in the art once the above disclosure is fully appreciated. It is intended that the following claims be interpreted to embrace all such variations and modifications.

What is claimed is:

1. A graphics system comprising:
a rendering engine configured to receive graphics data and generate samples in response to the graphics data;
a sample buffer configured to store the samples; and
a filtering engine configured to (a) read selected ones of the samples from the sample buffer, (b) filter the selected samples to generate a first pixel, and (c) apply a dynamic range compression operation to the first pixel to generate a modified pixel;
wherein the filtering engine is further configured to read one or more compression parameter vectors from a parameter storage unit and interpolate a pixel-specific parameter vector for the first pixel using the one or more compression parameter vectors; and
wherein the dynamic range compression operation operates on the first pixel using components of the pixel-specific parameter vector.

2. The graphics system of claim 1, wherein the filtering engine is further configured to clamp color components of the modified pixel to a displayable range.

3. The graphics system of claim 1, wherein the filtering engine is further configured to perform (a), (b) and (c) for each pixel in an array of pixels forming a frame.

4. The graphics system of claim 1, wherein the filtering engine is further configured to store generated pixels for a first frame including the first pixel in a pixel storage unit and compute updates for a set of compression parameter vectors from the stored pixels, and wherein the filtering engine is further configured to apply the dynamic range compression operation to generate pixels in a next frame using the updated compression parameter vectors.

5. The graphics system of claim 4, wherein each compression parameter vector of the set of compression parameter vectors corresponds to a point in a grid of points, and wherein the filtering engine is configured to compute an update for each compression parameter vector by analyzing stored pixels from the pixel storage unit in a neighborhood of the corresponding grid point.

6. The graphics system of claim 4, wherein each of said compression parameter vectors corresponds to a point in a grid of points, and wherein the filtering engine is configured to compute an update for each compression parameter vector by:
developing a histogram of pixel luminances of the stored pixels in a neighborhood of the corresponding grid point,
computing a set of one or more statistics from the histogram, and
computing the components of the compression parameter vector from the set of statistics.

7. The graphics system of claim 1, wherein the sample buffer is double buffered.

8. The graphics system of claim 1, wherein the selected samples comprise samples residing in a support region centered on a virtual pixel center corresponding to the pixel.

9. A method comprising:
(a) receiving graphics data and generating samples in response to the graphics data;
(b) storing the samples in a sample buffer;
a filtering engine (c) reading selected ones of the samples from the sample buffer,
(d) filtering the selected samples to generate a first pixel, and (e) applying a dynamic range compression operation to the first pixel to generate a modified pixel;
wherein the filtering engine uses a set of compression parameter vectors to perform (e) by:
storing generated pixels including the first pixel in a pixel storage unit, wherein said pixels form a first frame;
computing updates for the compression parameter vectors from the stored pixels; and
applying the dynamic range compression operation to generated pixels for a next frame using the updated compression parameter vectors.

10. The method of claim 9, further comprising the filtering engine performing (c), (d) and (e) for each pixel in an array of pixels forming the first frame.

11. The method of claim 9, wherein each of said compression parameter vectors corresponds to a point in a grid of points, the method further comprising computing an update for each compression parameter vector by analyzing the stored pixels from the pixel storage unit in a neighborhood of the corresponding grid point.

12. The method of claim 9, wherein each of said compression parameter vectors corresponds to a point in a grid of points, the method further comprising computing an update for each compression parameter vector by:
developing a histogram of pixel luminances of the stored pixels in a neighborhood of the corresponding grid point,
computing a set of one or more statistics from the histogram, and
computing the components of the updated compression parameter vector from the set of statistics.

13. The method of claim 9, wherein the sample buffer is double buffered, wherein (a) is performed by a rendering engine, wherein the rendering engine performs (a) on a second frame in parallel with the filtering engine performing (c), (d) and (e) on the first frame.

14. A graphics system comprising:
a rendering engine configured to receive graphics data and generate samples in response to the graphics data; and
a sample buffer configured to store the samples;
a filtering engine configured to (a) read selected ones of the samples from the sample buffer, (b) filter the selected samples to generate a first pixel, (c) incorporate a luminance of the first pixel into a luminance sum, and (d) multiply a component of the first pixel by a gain value to obtain an adjusted pixel;
wherein the filtering engine is further configured to perform (a), (b) and (d) for each pixel in an array of pixels forming a first frame, and to perform (c) for each pixel in at least a subset of the array of pixels; and
wherein the filtering engine is configured to compute an update for the gain value based on the luminance sum after completion of the first frame.

15. The graphics system of claim 14, wherein the filtering engine is further configured to clamp color components of the adjusted pixels to a displayable range.

16. The graphics system of claim 14, wherein the sample buffer is double buffered.

17. The graphics system of claim 14, wherein the filtering engine is configured to perform (a), (b), (c) and (d) at a sufficient rate to generate successive frames of video in real time.

18. The graphics system of claim 14, wherein the first pixel generated in (b) is a floating point quantity.

19. The graphics system of claim 14, wherein the filtering engine is configured to generate the first pixel by convolving the selected samples with respect to a programmable filter kernel.

20. The graphics system of claim 14, wherein the filtering engine is configured to apply the update for the gain value to pixels for a next frame.

21. The graphics system of claim 14, wherein the filtering engine is configured to incorporate the first pixel into the luminance sum by adding the luminance of the first pixel to the luminance sum.

22. The graphics system of claim 14, wherein the filtering engine is configured to compute the update for the gain value by calculating an image luminance value for the frame from the luminance sum, and adjusting the gain value by an amount depending on a difference between the image luminance and a target luminance.

23. A method comprising:
a rendering engine receiving graphics data and generating samples in response to the graphics data;
storing the samples in a sample buffer;
a filtering engine (a) reading selected ones of the samples from the sample buffer, (b) filtering the selected samples to generate a pixel, (c) incorporating a luminance of the first pixel into a luminance sum, and (d) multiplying a component of the pixel by a gain value to obtain an adjusted pixel;
the filtering engine performing (a), (b) and (d) for each pixel in an array of pixels forming a first frame, and performing (c) for each pixel in at least a subset of the array of pixels; and
the filtering engine computing an update for the gain value based on the luminance sum after completion of the first frame.

24. The method of claim 23, wherein the filtering engine computes the update for the gain value by calculating an image luminance value for the frame from the luminance sum and adjusting the gain value by an amount depending on a difference between the image luminance and a target luminance.

25. The method of claim 23, further comprising the filtering engine applying the update for the gain value to pixels for a next frame.

26. A graphics system comprising:
a rendering engine configured to receive graphics data and generate samples in response to the graphics data;
a sample buffer configured to store the samples; and
a filtering engine configured to (a) read selected ones of the samples from the sample buffer, (b) filter the selected samples to generate a first pixel, (c) incorporate a luminance of the first pixel into a luminance histogram, and (d) multiply a component of the first pixel by a gain value to obtain an adjusted pixel;
wherein the filtering engine is configured to compute an update for the gain value based on one or statistics determined from the luminance histogram.

27. The graphics system of claim 26, wherein the filtering engine is configured to perform (a), (b), (c) and (d) for each pixel in an array of pixels forming a frame.

28. The graphics system of claim 26, wherein the filtering engine is configured to perform (a), (b) and (d) for each pixel in an array of pixels forming a first frame, wherein the filtering engine is configured to incorporate each pixel of the frame into the luminance histogram if the pixel resides within a defined subset of the first frame.

29. The graphics system of claim 28, wherein the defined subset is a programmable subset.

30. The graphics system of claim 28, wherein the filtering engine is configured to apply the update for the gain value to pixels for a next frame.

31. A method comprising:
receiving graphics data; generating samples in response to the graphics data;
storing the samples in a sample buffer;
a filtering engine (a) reading selected ones of the samples from the sample buffer, (b) filtering the selected samples to generate a first pixel, (c) incorporating a luminance of the first pixel into a luminance histogram, and (d) multiplying a component of the first pixel by a gain value to obtain an adjusted pixel; and
the filtering engine computing an update for the gain value based on one or more statistics determined from the luminance histogram.

32. The method of claim 31, wherein the filtering engine performs (a), (b) and (d) for each pixel in an array of pixels forming a frame, wherein the filtering engine incorporates each pixel of the frame into the luminance histogram if the pixel resides within a defined subset of the frame.

33. The method of claim 31, wherein the filtering engine computes the update for the gain value after completion of a frame of pixels including the first pixel.

34. A graphics system comprising:
a rendering engine configured to receive a graphics primitive and determine if the graphics primitive is a dot, wherein, if the graphics primitive is a dot, the rendering engine is further configured to: (a) generate a sample position at a location of the dot, (b) compute a sample at the dot position, (c) modify exponent information in one or more components of the sample, thereby distinguishing the sample as a super-intensity sample, and (d) storing the super-intensity sample in a sample buffer; and
a filtering engine configured to (e) read samples including the super-intensity sample from the sample buffer, (f) conditionally amplify a mantissa of each of the samples based on a state of corresponding exponent information, and (g) filter the samples after said conditional amplification to generate pixels, wherein the pixels are usable to define at least a portion of a displayable image.

35. The graphics system of claim 34, wherein the exponent information is an amplification control bit corresponding to the mantissa in a conditional amplification data format.

36. The graphics system of claim 35, wherein the filtering engine is configured to perform (f) by shifting bits of each mantissa C bits to the left if the corresponding amplification control bit is set, wherein C is an integer greater than or equal to two.

37. The graphics system of claim 34, wherein the exponent information is an exponent corresponding to the mantissa in a stubby floating point data format.

38. The graphics system of claim 34, wherein the exponent information is an exponent factor corresponding to the mantissa in a block floating point data format.

39. The graphics system of claim 34, wherein the filtering engine is configured to generate the pixels by convolving the selected samples with respect to a programmable filter kernel.

40. The graphics system of claim 34, wherein the exponent information is modified so as to increase the intensity of the one or more sample components.

41. A graphics system comprising:
a rendering engine configured to receive a graphics primitive and determine if the graphics primitive is a one-dimensional object, wherein, if the graphics primitive is a one-dimensional object, the rendering engine is further configured to: (a) generate a series of sample positions along the one-dimensional object, (b) compute samples at the sample positions in said series, (c) modify exponent information in said computed samples, thereby distinguishing the samples as super-intensity samples, and (d) storing the super-intensity samples in a sample buffer; and
a filtering engine configured to (e) receive samples including the super-intensity samples from the sample buffer, (f) conditionally amplify a mantissa of each of the received samples based on a state of corresponding exponent information, and (g) filter the received samples after said conditional amplification to generate pixels, wherein the pixels are usable to define at least a portion of a displayable image.

42. The graphics system of claim 41, wherein the exponent information is an amplification control bit corresponding to the mantissa in a conditional amplification data format.

43. The graphics system of claim 42, wherein the filtering engine is configured to perform (f) by shifting bits of each mantissa C bits to the left if the corresponding amplification control bit is set, wherein C is an integer greater than or equal to two.

44. The graphics system of claim 41, wherein the exponent information is an exponent corresponding to the mantissa in a stubby floating point data format.

45. The graphics system of claim 41, wherein the exponent information is an exponent factor corresponding to the mantissa in a block floating point data format.

46. The graphics system of claim 41, wherein the filtering engine is configured to generate the pixels by convolving a subset of the received samples with respect to a programmable filter kernel.

47. The graphics system of claim 41, wherein the exponent information is modified so as to increase the intensity of one or more components of the corresponding computed sample.

48. The graphics system of claim 41, wherein the rendering engine generates the series of sample positions as closely as possible to the line segment with respect to a current sample density.

49. A method comprising:
receiving a graphics primitive, determining if the graphics primitive is a dot, and, if the graphics primitive is a dot:
(a) generating a sample position at a location of the dot,
(b) computing a sample at the dot position,
(c) modifying exponent information in one or more components of the sample, thereby distinguishing the sample as a super-intensity sample, and
(d) storing the super-intensity sample in a sample buffer;
a filtering engine reading samples including the super-intensity sample from the sample buffer,
the filtering engine conditionally amplifying a mantissa of each of the samples based on a state of corresponding exponent information, and
the filtering engine filtering the samples after said conditional amplification to generate pixels, wherein the pixels are usable to define at least a portion of a displayable image.

50. The method of claim 49, wherein the exponent information is an amplification control bit corresponding to the mantissa in a conditional amplification data format.

51. The method of claim 49, wherein the exponent information is an exponent corresponding to the mantissa in a stubby floating point data format.

52. The method of claim 49, wherein the exponent information is an exponent factor corresponding to the mantissa in a block floating point data format.

53. A method comprising:
receiving a graphics primitive, determining if the graphics primitive is a one-dimensional object, and, if the graphics primitive is a one-dimensional object:
(a) generating a series of sample positions along the one-dimensional object,
(b) computing samples at the sample positions in said series,
(c) modifying exponent information in said computed samples, thereby distinguishing the samples as super-intensity samples, and
(d) storing the super-intensity samples in a sample buffer;
a filtering engine receiving samples including the super-intensity samples from the sample buffer, conditionally amplifying a mantissa of each of the received samples based on a state of corresponding exponent information, and filtering the received samples after said conditional amplification to generate pixels, wherein the pixels are usable to define at least a portion of a displayable image.

54. The method of claim 53, wherein the exponent information is an amplification control bit corresponding to the mantissa in a conditional amplification data format.

55. The method of claim 53, wherein the exponent information is an exponent corresponding to the mantissa in a stubby floating point data format.

56. The method of claim 53, wherein the exponent information is an exponent factor corresponding to the mantissa in a block floating point data format.

57. A graphics system comprising:
a rendering engine configured to receive graphics data and generate samples in response to the graphics data;
a sample buffer configured to store the samples; and
a filtering engine configured to (a) read selected ones of the samples from the sample buffer, (b) filter the selected samples to generate a first pixel, and (c) apply a dynamic range compression operation to the first pixel to generate a modified pixel;
wherein the filtering engine is further configured to store generated pixels for a first frame including the first pixel in a pixel storage unit and compute updates for a set of compression parameter vectors from the stored pixels, and wherein the filtering engine is further configured to apply the dynamic range compression operation to generate pixels in a next frame using the updated compression parameter vectors.

58. A method comprising:
(a) receiving graphics data and generating samples in response to the graphics data;
(b) storing the samples in a double buffered sample buffer;
(c) reading selected ones of the samples from the sample buffer,
(d) filtering the selected samples to generate a first pixel, and
(e) applying a dynamic range compression operation to the first pixel to generate a modified pixel;
wherein a rendering engine performs (a) and (b) on a first frame in parallel with a filtering engine performing (c), (d) and (e) on a second frame.

* * * * *

UNITED STATES PATENT AND TRADEMARK OFFICE
CERTIFICATE OF CORRECTION

PATENT NO. : 7,106,352 B2 Page 1 of 1
APPLICATION NO. : 10/378049
DATED : September 12, 2006
INVENTOR(S) : Deering It is certified that error appears in the above-identified patent and that said Letters Patent is hereby corrected as shown below:

In the Claims:

Column 29
Line 55, please delete "on one or statistics" and substitute
-- on one or more statistics --.

Signed and Sealed this

Twelfth Day of December, 2006

JON W. DUDAS
*Director of the United States Patent and Trademark Office*